US008502921B2

(12) United States Patent
Tanaka

(10) Patent No.: US 8,502,921 B2
(45) Date of Patent: Aug. 6, 2013

(54) DIGITAL BROADCAST RECEIVER AND DIGITAL BROADCAST RECEPTION METHOD

(75) Inventor: Shunsuke Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/921,887

(22) PCT Filed: Jan. 15, 2009

(86) PCT No.: PCT/JP2009/000127
§ 371 (c)(1),
(2), (4) Date: Sep. 10, 2010

(87) PCT Pub. No.: WO2009/118971
PCT Pub. Date: Oct. 1, 2009

(65) Prior Publication Data
US 2011/0063499 A1    Mar. 17, 2011

(30) Foreign Application Priority Data

Mar. 27, 2008    (JP) ................................ 2008-083782

(51) Int. Cl.
*H04N 5/50*    (2006.01)
(52) U.S. Cl.
USPC ........... 348/569; 348/738; 348/563; 348/564; 348/423.1; 375/240
(58) Field of Classification Search
USPC ................. 375/240; 348/465, 476, 738, 563, 348/569, 564, 423.1; 386/95, 200
See application file for complete search history.

(56) References Cited

U.S. PATENT DOCUMENTS 5,953,066 A * 9/1999 Yun ............................... 348/485
6,111,613 A * 8/2000 Sasano et al. ................. 348/468
(Continued)

FOREIGN PATENT DOCUMENTS

JP    07-087420    3/1995
JP    10-98659     4/1998
(Continued)

OTHER PUBLICATIONS

Extended European Search Report dated Feb. 28, 2011 in corresponding European Application No. 09726249.7.
(Continued)

*Primary Examiner* — William C Vaughn, Jr
*Assistant Examiner* — Naod Belai
(74) *Attorney, Agent, or Firm* — Wenderoth, Lind & Ponack, L.L.P.

(57) ABSTRACT

The digital broadcast receiver according to the present invention includes: a signal separating section that separates a main audio signal and a video signal from a decoded digital broadcast signal, and when the decoded digital broadcast signal includes the sub-audio signal, further separates the sub-audio signal; an audio generating section that decodes the main audio signal to generate a decoded main audio signal, and decodes the sub-audio signal, when it has been further separated, to generate a decoded sub-audio signal; a video generating section that decodes the video signal to generate a decoded video signal; a detecting section that detects an input to the audio generating section of the separated sub-audio signal; and a control section that, when the detecting section has detected an input of the sub-audio, controls the video generating section to further generate a sub-audio image signal to display a sub-audio image indicating the presence of sub-audio.

14 Claims, 18 Drawing Sheets

U.S. PATENT DOCUMENTS

| | | | |
|---|---|---|---|
| 7,019,791 B2* | 3/2006 | Yoshizawa et al. | 348/738 |
| 8,103,145 B2* | 1/2012 | Jung et al. | 386/200 |
| 2002/0060747 A1* | 5/2002 | Nonomura | 348/465 |
| 2003/0090590 A1 | 5/2003 | Yoshizawa et al. | |
| 2007/0122113 A1* | 5/2007 | Suzuki | 386/95 |
| 2009/0066839 A1* | 3/2009 | Jung et al. | 348/565 |

FOREIGN PATENT DOCUMENTS

| | | |
|---|---|---|
| JP | 2004-180136 | 6/2004 |
| JP | 2005-151214 | 6/2005 |
| JP | 2006-352208 | 12/2006 |
| JP | 2007-213661 | 8/2007 |
| JP | 2007-214865 | 8/2007 |
| JP | 2008-54188 | 3/2008 |

OTHER PUBLICATIONS

International Search Report issued Feb. 10, 2009 in corresponding International Application No. PCT/JP2009/000127.

* cited by examiner

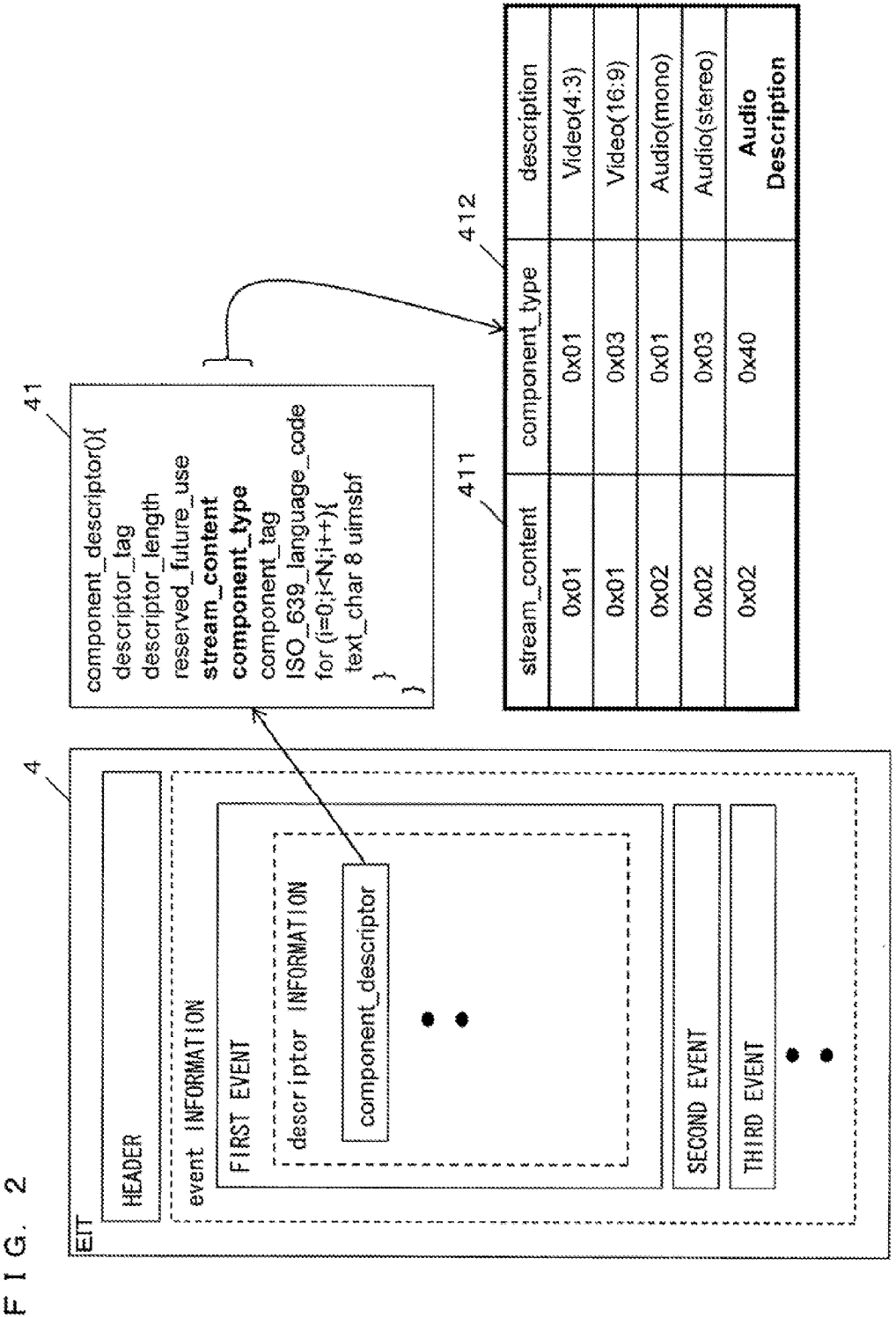

FIG. 3

MAIN AUDIO INFORMATION IN PMT — 51

//main programme audio details
{
stream_type 0x03 ; Audio MPEG1
reserved 111b
elementary_PID 0x0259 ; PID for programme sound
reserved 1111b
ES_info_length 0x009
{
descriptor_tag 0x52 ; stream identifier descriptor
descriptor_length 0x01
component_tag 0x02
}
{
descriptor_tag 0x0A ; ISO 639 language descriptor
descriptor_length 0x04
ISO_639_language_code "eng" ; English
audio_type 0x00 ; undefined
}
}

SUB-AUDIO INFORMATION IN PMT — 52

// audio description details
{
stream_type 0x03 ; Audio MPEG1
reserved 111b
elementary_PID 0x025A ; PID for audio description
reserved 1111b
ES_info_length 0x009
{
descriptor_tag 0x52 ; stream identifier descriptor
descriptor_length 0x01
component_tag 0x03
}
{
descriptor_tag 0x0A ; ISO 639 language descriptor
descriptor_length 0x04
ISO_639_language_code "eng" ; English
audio_type 0x03 ; visual impaired commentary
}
}

DIGITAL BROADCAST RECEIVER AND DIGITAL BROADCAST RECEPTION METHOD

TECHNICAL FIELD

The present invention relates to a digital broadcast receiver and a digital broadcast reception method, and more particularly, to a digital broadcast receiver and a digital broadcast reception method, which inform a viewer by a visual display whether a program being viewed contains sub-audio.

BACKGROUND ART

There has been proposed a digital broadcast receiver, which refers to an EIT (Event Information Table) included in information of a program being viewed to determine presence or absence of sub-audio, and which, when the result of determination is that sub-audio is present, displays an OSD image indicating the presence of sub-audio (for example, Patent Document 1). Specifically, the digital broadcast receiver determines presence or absence of sub-audio by determining whether the EIT includes sub-audio information. This digital broadcast receiver enables a viewer to recognize presence or absence of sub-audio and to reproduce sub-audio when necessary.

There has been also proposed a digital broadcast receiver which refers to a PMT (Program Map Table) included in program information to determine presence or absence of sub-audio. With reference to FIG. 16, this digital broadcast receiver will be described in detail. FIG. 16 is a diagram illustrating a configuration of the digital broadcast receiver which determines presence or absence of sub-audio with reference to a PMT.

In FIG. 16, a digital broadcast receiver 2 is connected to an antenna 1 and includes a receiving section 21, a signal separating section 22, an audio generating section 23, an audio reproducing section 24, a video generating section 25, a video display section 26, and a control section 27.

The receiving section 21 decodes a digital broadcast signal that is received by the antenna 1, and outputs to the signal separating section 22 a transport stream that is a decoded digital broadcast signal. The digital broadcast signal is a signal in which an audio signal including a main audio signal and a video signal are multiplexed, or a signal in which an audio signal including a main audio signal and a sub-audio signal, and a video signal are multiplexed.

The signal separating section 22 separates, from the transport stream inputted thereto, a main audio data stream (main audio stream) that is a main audio signal, a video data stream (video stream) that is a video signal, and program information data. When a sub-audio data stream (sub-audio stream) that is a sub-audio signal is included in the transport stream inputted thereto, the signal separating section 22 further separates the sub-audio stream from the inputted transport stream. Then, the signal separating section 22 outputs the main audio stream having been separated to the audio generating section 23, and outputs the video stream having been separated to the video generating section 25. The signal separating section 22, when it has further separated the sub-audio stream, outputs the sub-audio stream having been separated to the audio generating section 23.

As shown in FIG. 17, the audio generating section 23 includes a main audio decoding section 231, a sub-audio decoding section 232, and an audio synthesizing section 233. FIG. 17 is a diagram illustrating a specific configuration of the audio generating section 23. The main audio decoding section 231 decodes the main audio stream inputted thereto to generate a decoded main audio signal that can be reproduced, and outputs the decoded main audio signal to the audio synthesizing section 233. The sub-audio decoding section 232 decodes the sub-audio stream inputted thereto to generate a decoded sub-audio signal that can be reproduced, and outputs the decoded sub-audio signal to the audio synthesizing section 233. In accordance with a control of the control section 27, the audio synthesizing section 233 synthesizes the decoded main audio signal and the decoded sub-audio signal to output the synthesized signal to the audio reproducing section 24, or outputs only the decoded main audio signal to the audio reproducing section 24.

The audio reproducing section 24 is configured by, for example, a speaker. On receipt of the synthesized signal of the decoded main audio signal and the decoded sub-audio signal from the audio synthesizing section 233, the audio reproducing section 24 reproduces the main audio and the sub-audio simultaneously. On the other hand, when only the decoded main audio signal is received from the audio synthesizing section 233, the audio reproducing section 24 reproduces only the main audio.

As shown in FIG. 18, the video generating section 25 includes an OSD image output section 251, a video decoding section 252, and a video synthesizing section 253. FIG. 18 is a diagram illustrating a specific configuration of the video generating section 25. In accordance with a control of the control section 27, the OSD image output section 251 outputs an OSD image signal indicating the presence of sub-audio to the video synthesizing section 253, or does not output the OSD image signal. The video decoding section 252 decodes the video stream that is received from the signal separating section 22, and outputs the decoded video signal that can be displayed to the video synthesizing section 253. In accordance with a control of the control section 27, the video synthesizing section 253 synthesizes the OSD image signal and the decoded video signal to output the synthesized signal to the video display section 26, or outputs only the decoded video signal to the video display section 26.

The video display section 26 is configured by, for example, a display. On receipt of the synthesized signal of the OSD image signal and the decoded video signal from the video synthesizing section 253, the video display section 26 displays an OSD image on a broadcast video. On the other hand, when only the decoded video signal is received from the video synthesizing section 253, the video display section 26 displays only the broadcast video.

The control section 27 obtains, at a predetermined timing, a PMT included in the program information data having been separated by the signal separating section 22. Then, the control section 27 determines presence or absence of sub-audio by determining whether the obtained PMT includes sub-audio information.

When the result of determination is that the sub-audio is absent, the control section 27 controls the OSD image output section 251 so as not to output the OSD image signal while controlling the video synthesizing section 253 so as to output only the decoded video signal. Accordingly, the video display section 26 displays only the broadcast video. The control section 27 further controls the audio synthesizing section 233 so as to output only the decoded main audio signal to the audio reproducing section 24. Thus, the audio reproducing section 24 reproduces only the main audio.

When the result of determination is that the sub-audio is present, the control section 27 controls the OSD image output section 251 so as to output the OSD image signal while controlling the video synthesizing section 253 so as to synthesize the OSD image signal and the decoded video signal and output the synthesized signal. Accordingly, the video display section 26 displays the OSD image on the broadcast video. The control section 27, when it has accepted an instruction to reproduce the sub-audio from a viewer who saw the OSD image displayed on the broadcast video, controls the audio synthesizing section 233 so as to synthesize the decoded main audio signal and the decoded sub-audio signal and output the synthesized signal. Accordingly, the audio reproducing section 24 reproduces the main audio and the sub-audio simultaneously.

As described above, the conventional digital broadcast receiver determines presence or absence of sub-audio with reference to an EIT and/or a PMT included in the information of a program being viewed, and when the result of determination is that the sub-audio is present, it displays an OSD image indicating the presence of sub-audio.

Patent Document 1: Japanese Laid-Open Patent Publication No. 2005-151214.

SUMMARY OF THE INVENTION

Problems to be Solved by the Invention

However, depending on the data description rules of a broadcast station, there may be a case where an EIT and/or a PMT include sub-audio information but a transport stream does not actually include a sub-audio stream. In such a case, because the conventional digital broadcast receiver determines presence or absence of sub-audio with reference to the EIT and/or the PMT, the conventional digital broadcast receiver displays an OSD image indicating the presence of sub-audio even though it cannot actually reproduce the sub-audio. Consequently, there is a problem that the conventional digital broadcast receiver may not correctly inform a viewer of presence or absence of sub-audio, which confuses the viewer.

Therefore, an object of the present invention is to provide a digital broadcast receiver and a digital broadcast reception method which can correctly inform a viewer of presence or absence of sub-audio in a program being viewed.

Solution to the Problems

The present invention has been made for solving the above problem. A digital broadcast receiver according to the present invention is a digital broadcast receiver which receives a digital broadcast signal in which a video signal and either of an audio signal including a main audio signal or an audio signal including a main audio signal and a sub-audio signal are multiplexed, and which informs a viewer by a visual display whether the received digital broadcast signal includes the sub-audio signal. The digital broadcast receiver includes: a receiving section that receives the digital broadcast signal and decodes the received digital broadcast signal to output a decoded digital broadcast signal; a signal separating section that separates the main audio signal and the video signal from the decoded digital broadcast signal inputted thereto, and when the audio signal consists of the main audio signal and the sub-audio signal, further separates the sub-audio signal from the inputted decoded digital broadcast signal; an audio generating section that decodes the main audio signal inputted thereto, which has been separated by the signal separating section to generate a decoded main audio signal that can be reproduced, and when the signal separating section has further separated the sub-audio signal, decodes the sub-audio signal inputted thereto, which has been separated by the signal separating section to further generate a decoded sub-audio signal that can be reproduced; a video generating section that decodes the video signal inputted thereto, which has been separated by the signal separating section to generate a decoded video signal that can be displayed; a detecting section that detects an input to the audio generating section of the sub-audio signal having been separated by the signal separating section; and a control section that, when the detecting section has detected an input of the sub-audio signal to the audio generating section, controls the video generating section so as to further generate a sub-audio image signal to display a sub-audio image indicating the presence of the sub-audio signal.

According to the above configuration, the control section determines presence or absence of sub-audio not by using the EIT and/or the PMT but by also using a detection result of the detecting section, and controls generation of the sub-audio image signal. Thus, presence or absence of sub-audio can be determined more accurately than by the conventional art and can be informed correctly to a viewer by using the sub-audio image signal. As a result, the viewer is prevented from being confused.

Preferably, the audio generating section may include: a main audio decoding section that decodes the main audio signal inputted thereto to generate the decoded main audio signal; and a sub-audio decoding section that decodes the sub-audio signal inputted thereto to generate the decoded sub-audio signal. The detecting section may detect an input of the sub-audio signal to the sub-audio decoding section.

In this case, the detecting section may further monitor an input buffer included in the sub-audio decoding section to detect an input of the sub-audio signal to the sub-audio decoding section. Alternatively, the detecting section may be provided at a preceding stage of the sub-audio decoding section to detect an input of the sub-audio signal thereto to detect an input of the sub-audio signal to the sub-audio decoding section.

Preferably, the detecting section may further detect whether or not the level of the decoded sub-audio signal is greater than or equal to a predetermined value. The control section, when the detecting section has detected an input of the sub-audio signal to the audio generating section and also has detected that the level of the decoded sub-audio signal is greater than or equal to the predetermined value, may control the video generating section so as to further generate the sub-audio image signal.

In this case, the audio generating section may further include: a main audio decoding section that decodes the main audio signal inputted thereto to generate the decoded main audio signal; and a sub-audio decoding section that decodes the sub-audio signal inputted thereto to generate the decoded sub-audio signal. The detecting section may detect an input of the sub-audio signal to the sub-audio decoding section to detect whether or not the level of the decoded sub-audio signal is greater than or equal to the predetermined value. The detecting section may further monitor an input buffer included in the sub-audio decoding section to detect an input of the sub-audio signal to the sub-audio decoding section, and may monitor an output buffer included in the sub-audio decoding section to detect whether or not the level of the decoded sub-audio signal is greater than or equal to the predetermined value. Alternatively, the detecting section may include: an input detecting section which is provided at a preceding stage of the sub-audio decoding section and which detects an input of the sub-audio signal thereto to detect an input of the sub-audio signal to the sub-audio decoding section; and an output detecting section which is provided at a subsequent stage of the sub-audio decoding section, and which refers to the level of the decoded sub-audio signal inputted thereto to detect whether or not the level of the decoded sub-audio signal is greater than or equal to the predetermined value.

Alternatively, the control section may control, in a situation where the sub-audio image signal is being generated, when the detecting section has detected an input of the sub-audio signal to the audio generating section and also has detected that the level of the decoded sub-audio signal is lower than the predetermined value, the video generating section so as to continue the generation of the sub-audio image signal for a set time period.

Preferably, included is a display section that may display an image based on the decoded video signal generated by the video generating section, and may further display, when the video generating section has further generated a sub-audio image signal, a sub-audio image based on the sub-audio image signal on an image based on the decoded video signal.

Preferably, the digital broadcast receiver may be connected to an external display device. The video generating section may output the generated decoded video signal to the display device, and when the video generating section has further generated the sub-audio image signal, may synthesize the generated decoded video signal and the sub-audio image signal to output the synthesized signal to the display device so as to display the sub-audio image based on the sub-audio image signal on the image based on the decoded video signal.

Preferably, the digital broadcast receiver may be connected to an external display device, and the digital broadcast receiver may further include a display section that displays the sub-audio image based on the sub-audio image signal further generated by the video generating section, and the video generating section may output the generated decoded video signal to the display device.

The present invention is also directed to a digital broadcast reception method for solving the above problem. The digital broadcast reception method according to the present invention is a digital broadcast reception method of receiving a digital broadcast signal in which a video signal and either of an audio signal including a main audio signal or an audio signal including a main audio signal and a sub-audio signal are multiplexed, and informing a viewer by a visual display whether the received digital broadcast signal includes the sub-audio signal. The digital broadcast reception method includes: a receiving step of receiving the digital broadcast signal and decoding the received digital broadcast signal to output a decoded digital broadcast signal; a signal separating step of separating the main audio signal and the video signal from the decoded digital broadcast signal, and when the audio signal consists of the main audio signal and the sub-audio signal, further separating the sub-audio signal from the decoded digital broadcast signal; an audio generating step of decoding the main audio signal having been separated in the signal separating step to generate a decoded main audio signal that can be reproduced, and when the sub-audio signal has been further separated in the signal separating step, decoding the sub-audio signal having been separated in the signal separating step to further generate a decoded sub-audio signal that can be reproduced; a video generating step of decoding the video signal having been separated in the signal separating step to generate a decoded video signal that can be displayed; a detecting step of detecting a decoding in the audio generating step of the sub-audio signal having been separated in the signal separating step; and a sub-audio image generating step of generating a sub-audio image signal to display a sub-audio image indicating the presence of the sub-audio signal when the decoding in the audio generating step of the sub-audio signal is detected in the detecting step.

Effect of the Invention

According to the present invention, it is possible to provide a digital broadcast receiver and a digital broadcast reception method which can correctly inform a viewer of presence or absence of sub-audio in a program being viewed.

BRIEF DESCRIPTION OF THE DRAWINGS

FIG. 2 is a diagram illustrating a configuration example of an EIT.

FIG. 3 is a diagram illustrating a configuration example of main audio information in a PMT and a configuration example of sub-audio information in the PMT.

FIG. 11 is a flowchart illustrating a procedure of a display control process of a control section 37a.

Figure 1:
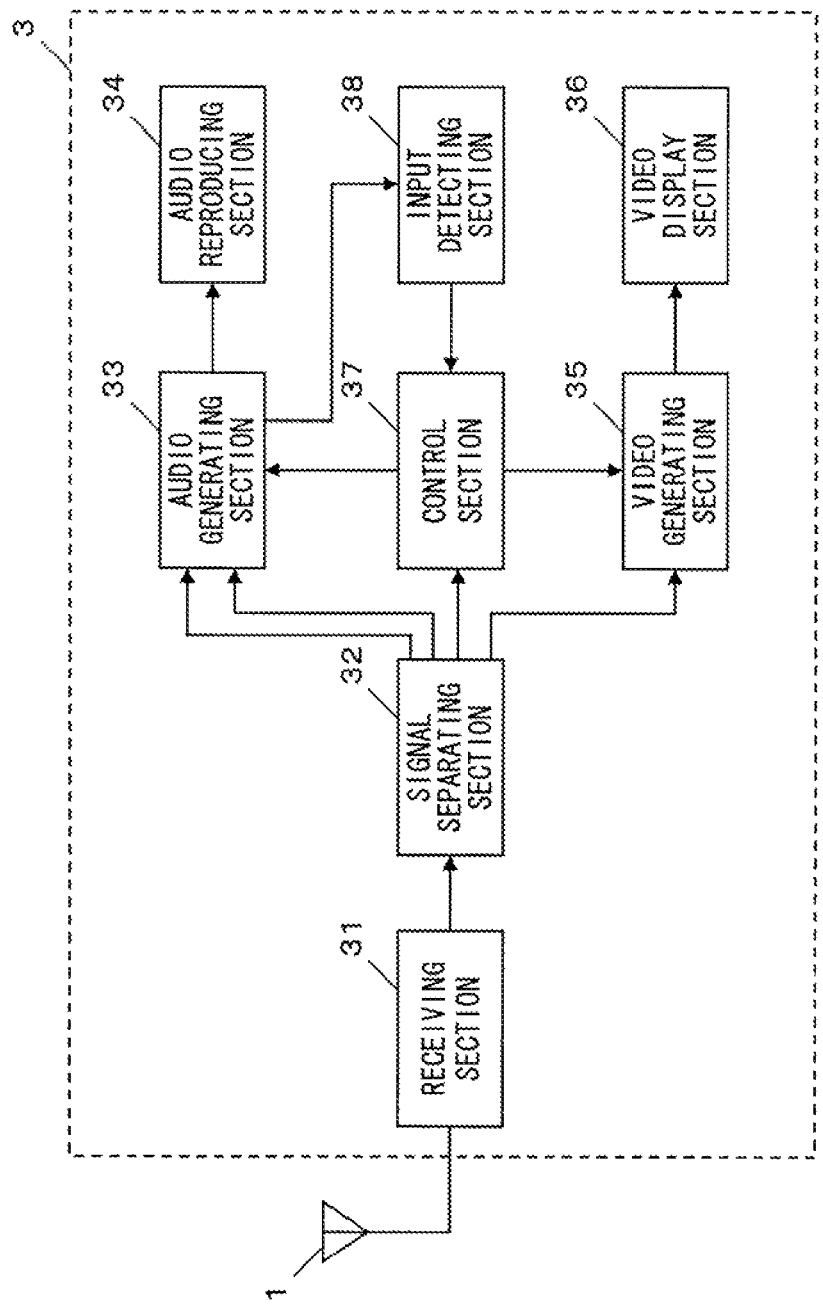
FIG. 1 is a diagram illustrating a configuration example of a digital broadcast receiver according to a first embodiment.

DESCRIPTION OF THE REFERENCE CHARACTERS 1 antenna
2, 3, 3a, 3b digital broadcast receiver
21, 31 receiving section
22, 32 signal separating section
23, 33 audio generating section
24, 34 audio reproducing section
25, 35 video generating section
26, 36 video display section
27, 37, 37a, 37b control section 38 input detecting section
39 input/output detecting section
231, 331 main audio decoding section
232, 332 sub-audio decoding section
233, 333 audio synthesizing section
251, 351 OSD image output section
252, 352 video decoding section
253, 353 video synthesizing section

DETAILED DESCRIPTION OF THE INVENTION

Hereinafter, embodiments of the present invention will be described with reference to the drawings.

First Embodiment

With reference to FIG. 1, description will be given of a configuration of a digital broadcast receiver according to a first embodiment of the present invention. FIG. 1 is a diagram illustrating a configuration example of the digital broadcast receiver according to the first embodiment. In FIG. 1, a digital broadcast receiver 3 is connected to an antenna 1, and includes a receiving section 31, a signal separating section 32, an audio generating section 33, an audio reproducing section 34, a video generating section 35, a video display section 36, a control section 37, and an input detecting section 38.

Figure 16:
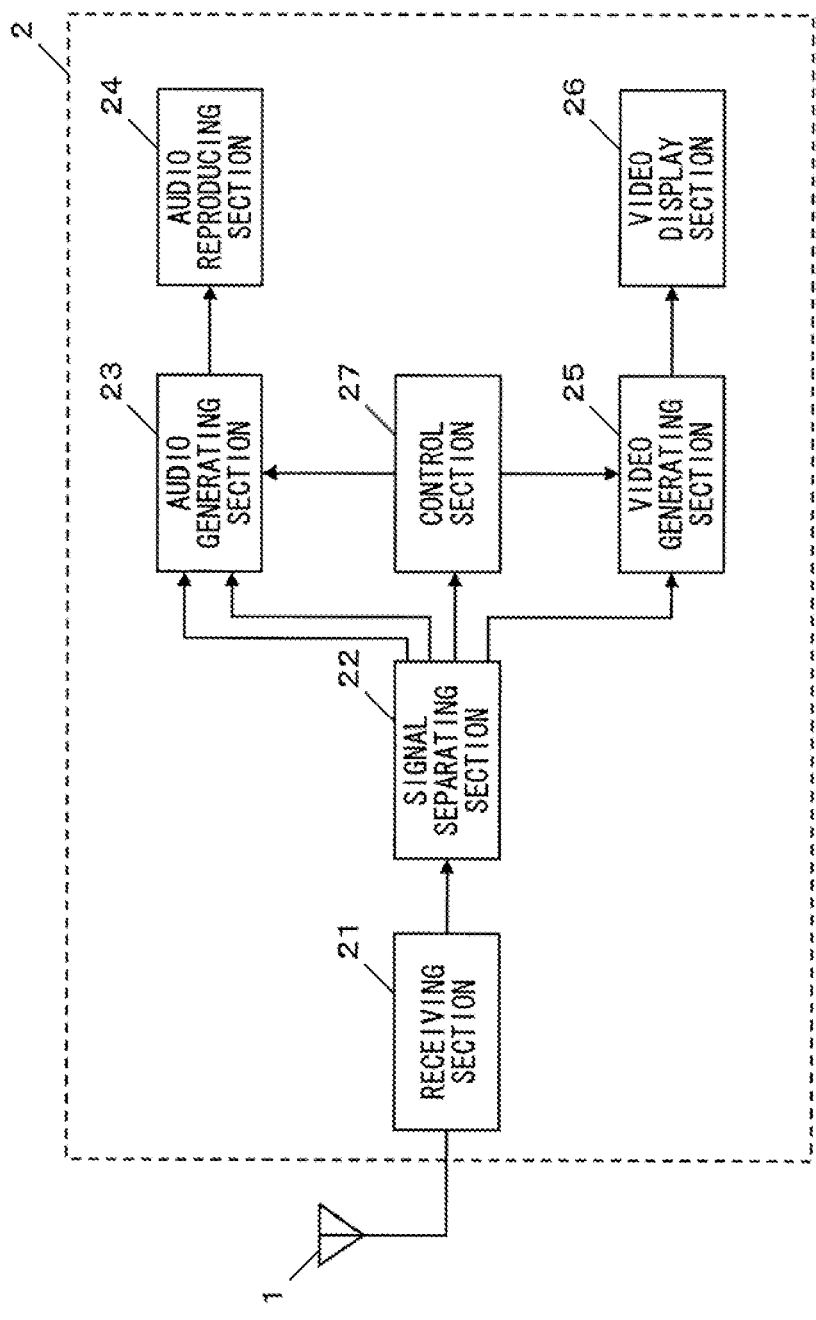
FIG. 16 is a diagram illustrating a configuration example of a digital broadcast receiver which determines presence or absence of sub-audio with reference to a PMT.
Figure 17:
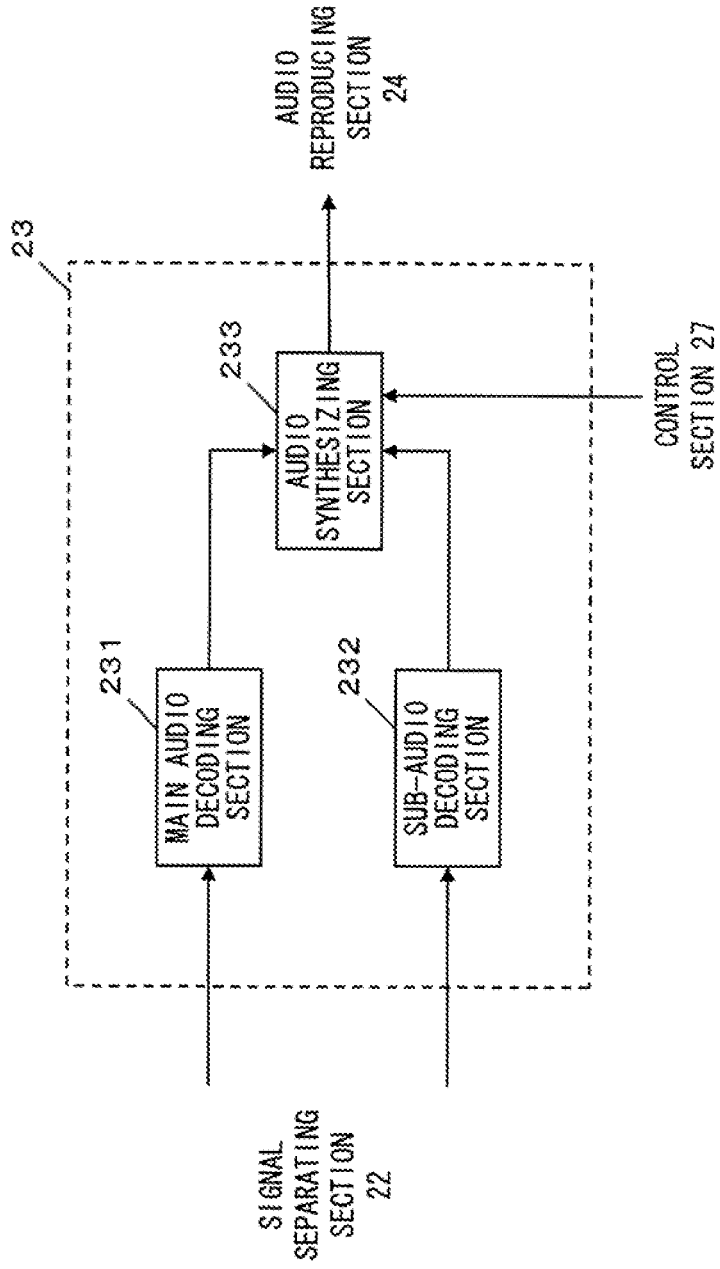
FIG. 17 is a diagram illustrating a specific configuration of the audio generating section 23.
Figure 18:
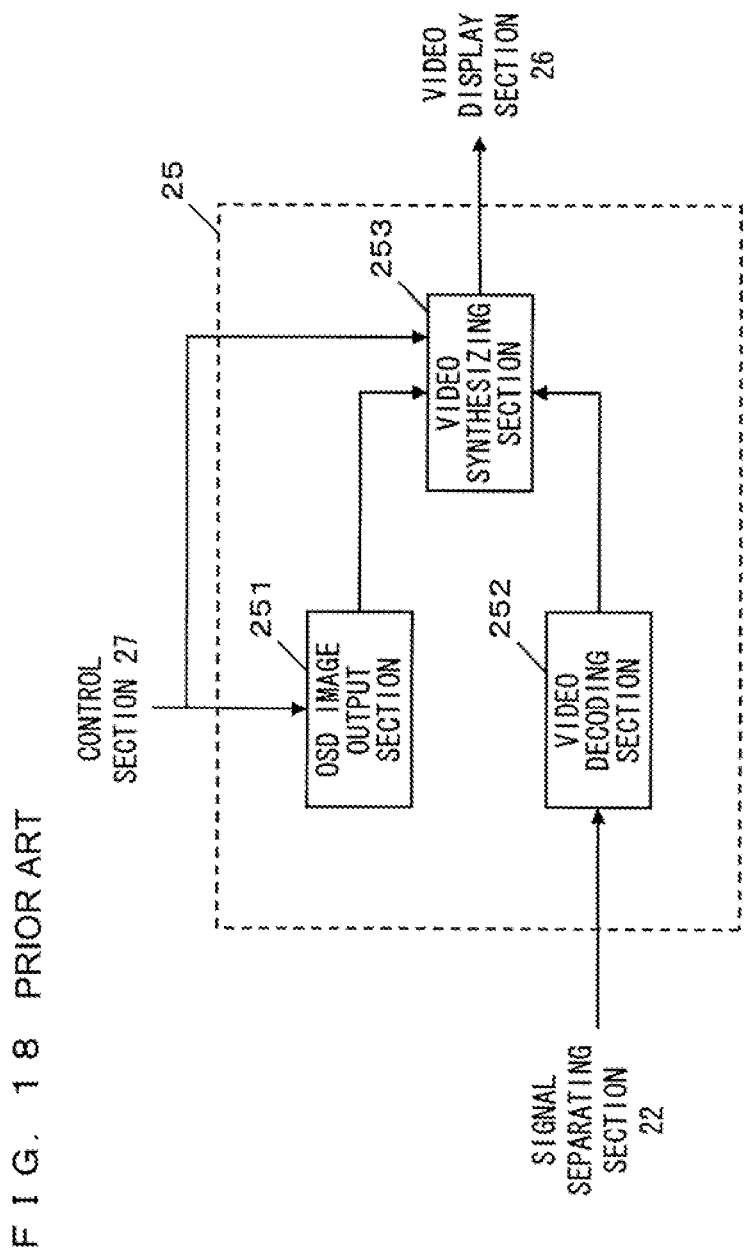
FIG. 18 is a diagram illustrating a specific configuration of a video generating section 25.

The digital broadcast receiver 3 according to the present embodiment is different from the conventional digital broadcast receiver 2 in FIG. 16, mainly in that the digital broadcast receiver 3 further includes the input detecting section 38 and thereby determines presence or absence of sub-audio.

The receiving section 31 decodes a digital broadcast signal received by the antenna 1 to output, to the signal separating section 32, a transport stream that is a decoded digital broadcast signal.

The signal separating section 32 separates, from the transport stream inputted thereto, a main audio stream that is a main audio signal, a video stream that is a video signal, and program information data. The signal separating section 32, when the inputted transport stream includes a sub-audio stream that is a sub-audio signal, further separates the sub-audio stream from the inputted transport stream. The signal separating section 32 outputs the main audio stream having been separated to the audio generating section 33 and outputs the video stream having been separated to the video generating section 35. The signal separating section 32, when it has further separated the sub-audio stream, outputs the sub-audio stream having been separated to the audio generating section 33.

The program information data separated by the signal separating section 32 includes an EIT and a PMT. FIG. 2 shows a configuration example of the EIT. As FIG. 2 shows, in an EIT 4, a header and event information are described. In the event information, a plurality of events (a first event, a second event, etc.) are described. In each event, described is descriptor information in which a component descriptor (component_descriptor) 41 is described. In the component descriptor 41, a stream content (stream_content) 411 and a component type (component_type) 412 are described. Based on the description of the stream content 411 and the description of the component type 412, whether the video of the program is "Video (4:3)" or "Video (16:9)" can be recognized For example, when the component descriptor 41 includes the stream content 411 in which "0x01" is described and the component type 412 in which "0x01" is described, the video of the program can be recognized as "Video (4:3)." Whether main audio of the program is "Audio (mono)" or "Audio (stereo)" can be also recognized. For example, when the component descriptor 41 includes the stream content 411 in which "0x02" is described and the component type 412 in which "0x01" is described, the main audio of the program can be recognized as "Audio (mono)." For example, when a data description is based on a rule that "Audio Description" audio (sub-audio) is included when the component type is "0x40", if the component descriptor 41 includes the stream content 411 in which "0x02" is described and the component type 412 in which "0x40" is described, it can be recognized that "Audio Description" that is sub-audio is included in the program.

FIG. 3 shows a configuration example of main audio information in a PMT and a configuration example of sub-audio information in the PMT. In FIG. 3, 51 illustrates the main audio information, and 52 illustrates the sub-audio information. When a program contains audio, the PMT always includes the main audio information 51. The PMT may or may not include the sub-audio information 52 depending on each section such as a CM section or a non-CM section.

Figure 4:
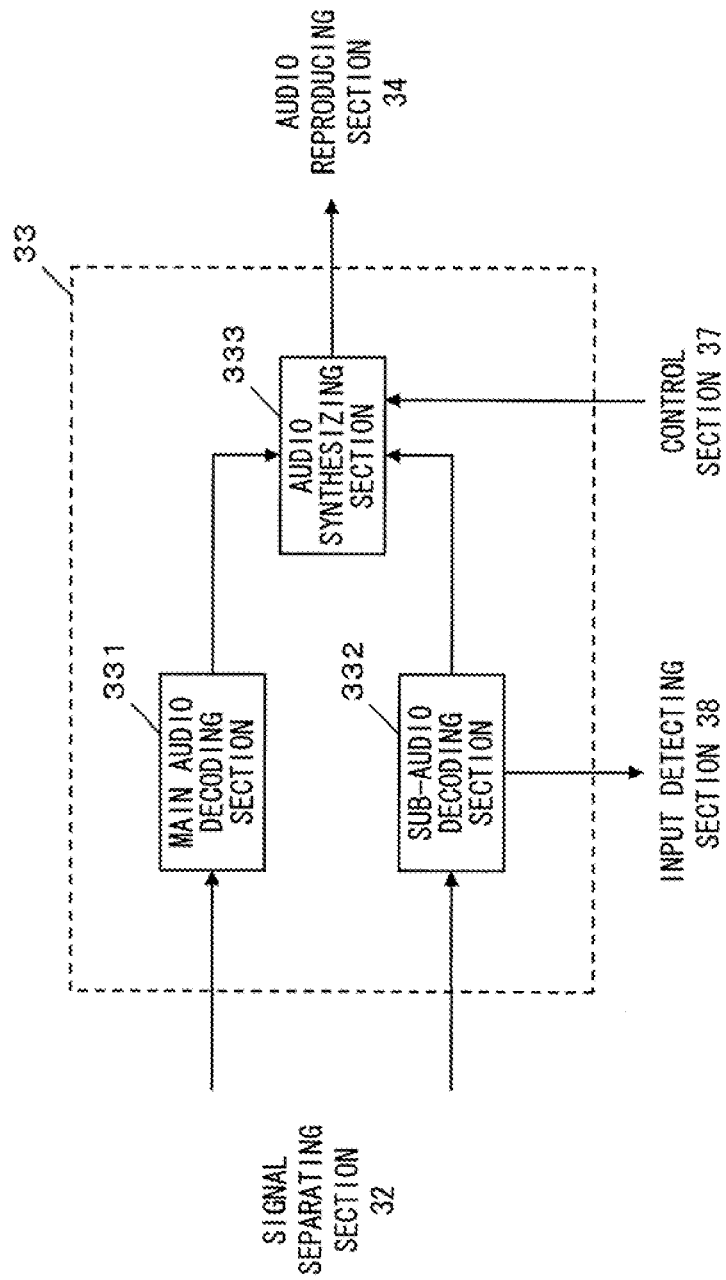
FIG. 4 is a diagram illustrating a specific configuration of an audio generating section 33 according to the first embodiment.

As shown in FIG. 4, the audio generating section 33 includes a main audio decoding section 331, a sub-audio decoding section 332, and an audio synthesizing section 333. FIG. 4 is a diagram illustrating a specific configuration of the audio generating section 33. The main audio decoding section 331 decodes the main audio stream inputted thereto to generate a decoded main audio signal that can be reproduced and outputs the decoded main audio signal to the audio synthesizing section 333. The sub-audio decoding section 332 decodes the sub-audio stream inputted thereto to generate a decoded sub-audio signal and outputs the decoded sub-audio signal to the audio synthesizing section 333. The audio synthesizing section 333, based on a control of the control section 37, synthesizes the decoded main audio signal and the decoded sub-audio signal to output the synthesized signal to the audio reproducing section 34, or outputs only the decoded main audio signal to the audio reproducing section 34.

The audio reproducing section 34 is configured by, for example, a speaker. On receipt of the synthesized signal of the decoded main audio signal and the decoded sub-audio signal from the audio synthesizing section 333, the audio reproducing section 34 reproduces the main audio and the sub-audio simultaneously. When only the decoded main audio signal is received from the audio synthesizing section 333, the audio reproducing section 34 reproduces only the main audio.

Figure 5:
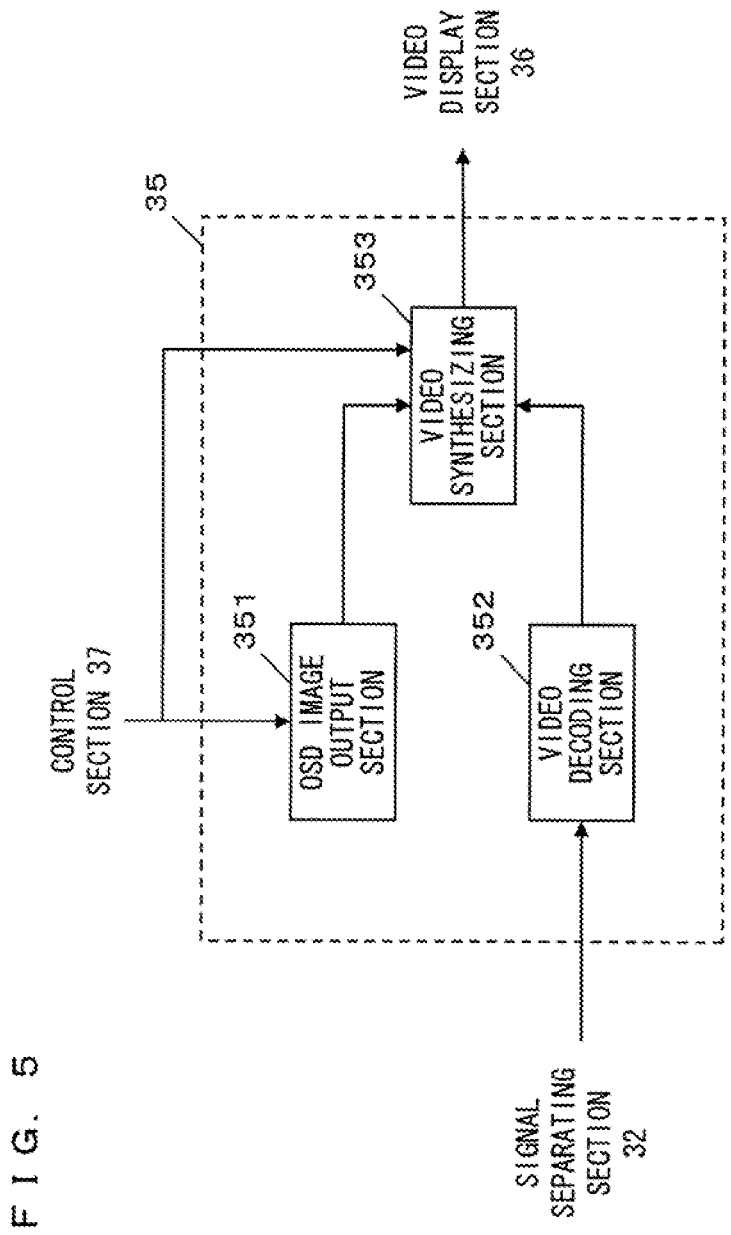
FIG. 5 is a diagram illustrating a specific configuration of a video generating section 35 according to the first embodiment.

As shown in FIG. 5, the video generating section 35 includes an OSD image output section 351, a video decoding section 352, and a video synthesizing section 353. FIG. 5 is a diagram illustrating a specific configuration of the video generating section 35. The OSD image output section 351, based on a control of the control section 37, outputs an OSD image signal to display a sub-audio image indicating the presence of sub-audio to the video synthesizing section 353, or does not output the OSD image signal. The video decoding section 352 decodes the video stream received from the signal separating section 32 to output a decoded video signal that can be displayed to the video synthesizing section 353. The video synthesizing section 353, based on a control of the control section 37, synthesizes the OSD image signal and the decoded video signal to output the synthesized signal to the video display section 36, or outputs only the decoded video signal to the video display section 36.

The video display section 36 is configured by, for example, a display. On receipt of the synthesized signal of the OSD image signal and the decoded video signal from the video synthesizing section 353, the video display section 36 displays an OSD image on a broadcast video. When only the decoded video signal is received from the video synthesizing section 353, the video display section 36 displays only the broadcast video.

Figure 6:
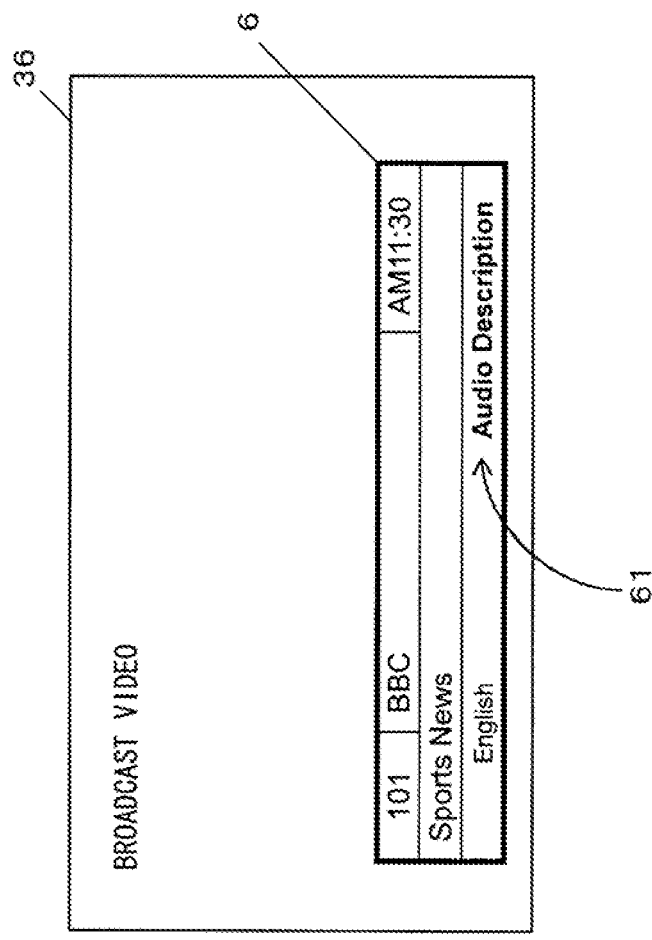
FIG. 6 is a diagram illustrating how a video display section 36 displays an OSD image on a broadcast video.

FIG. 6 is a diagram illustrating how the video display section 36 displays an OSD image on a broadcast video. In the case of FIG. 6, a program banner 6 that is the OSD image includes "Audio Description" which is a sub-audio image 61.

The control section 37 obtains, at a predetermined timing, the PMT included in program information data having been separated by the signal separating section 32 and a detection result of a below-described input detecting section 38. Then, based on the obtained PMT and the detection result, the control section 37 determines presence or absence of sub-audio at a predetermined timing.

When the result of determination is that sub-audio is absent, the control section 37 controls the OSD image output section 351 so as not to output the OSD image signal while controlling the video synthesizing section 353 so as to output only the decoded video signal. Accordingly, the video display section 36 displays only the broadcast video. The control section 37 further controls the audio synthesizing section 333 so as to output only the decoded main audio signal to the audio reproducing section 34. Thus, the audio reproducing section 34 reproduces only the main audio.

When the result of determination is that the sub-audio is present, the control section 37 controls the OSD image output section 351 so as to output the OSD image signal while controlling the video synthesizing section 353 so as to synthesize OSD image signal and the decoded video signal and output the synthesized signal. Accordingly, the video display section 36 displays the OSD image on the broadcast video. The control section 37, when it has accepted an instruction to reproduce the sub-audio from a viewer who saw the OSD image displayed on the broadcast video, controls the audio synthesizing section 333 so as to synthesize the decoded main audio signal and the decoded sub-audio signal and output the synthesized signal. Accordingly, the audio reproducing section 34 reproduces the main audio and the sub-audio simultaneously.

The input detecting section 38 directly monitors an input buffer included in the sub-audio decoding section 332 to detect an input of the sub-audio stream to the sub-audio decoding section 332 at a predetermined timing. The input detecting section 38 outputs the detection result to the control section 37. The control section 37 determines that the sub-audio is present only when the PMT includes sub-audio information and the input detecting section 38 has detected an input of the sub-audio stream.

Figure 7:
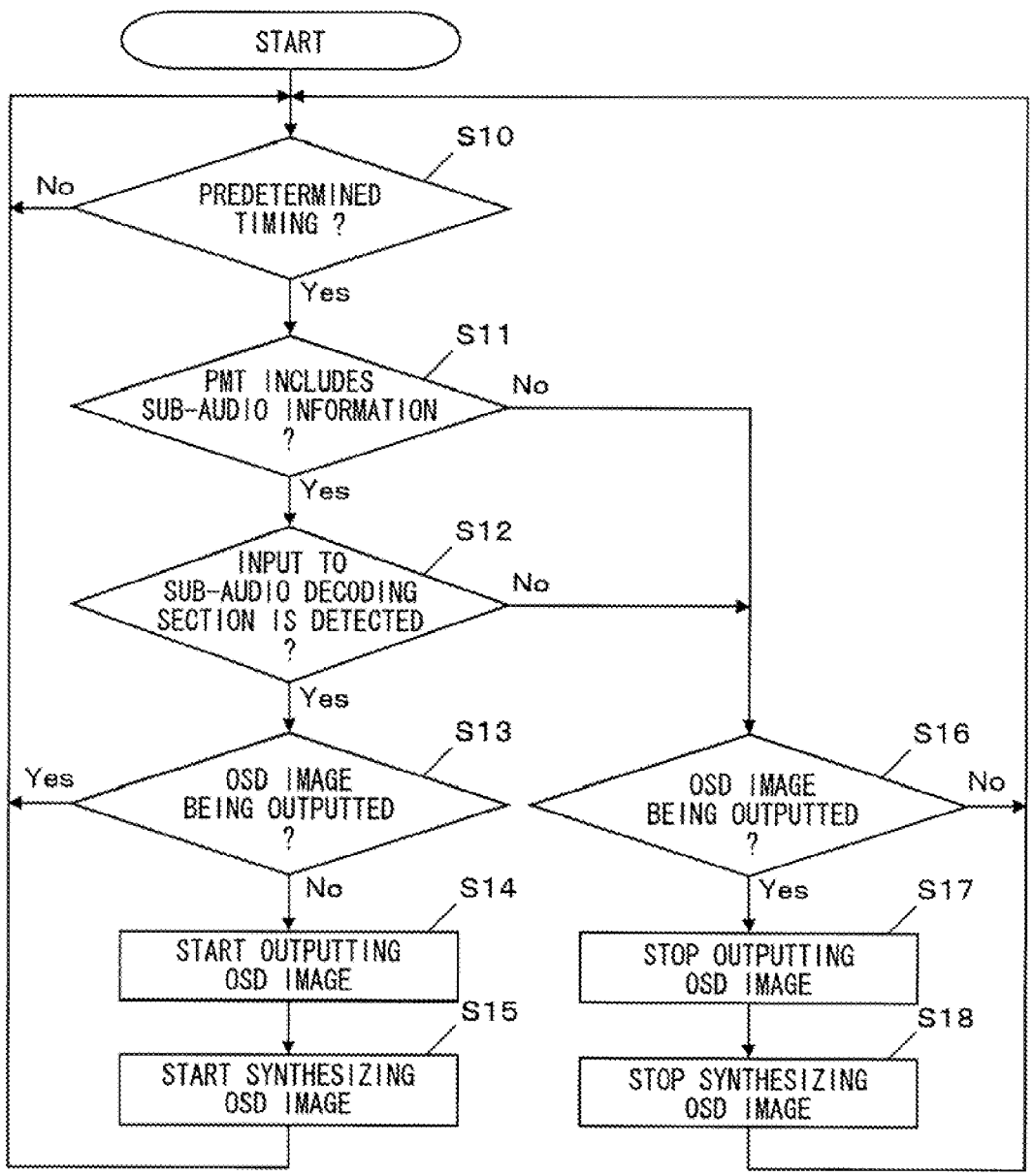
FIG. 7 is a flowchart illustrating a procedure of a display control process of a control section 37.

Next, with reference to FIG. 7, description will be given of the procedure of the above-described display control process of the control section 37. FIG. 7 is a flowchart illustrating the procedure of the display control process of the control section 37.

In FIG. 7, as the control section 37 starts a display control, the control section 37 determines whether a predetermined timing is reached (step S10). When the predetermined timing is reached (Yes in step S10), the control section 37 obtains the PMT included in the program information data having been separated by the signal separating section 32 to determine whether the obtained PMT includes sub-audio information (step S11).

When the obtained PMT includes the sub-audio information (Yes in step S11), the control section 37 obtains an detection result of the input detecting section 38 to determine whether an input of a sub-audio stream is detected (step S12). When an input of the sub-audio stream is detected (Yes in step S12), the control section 37 determines whether the OSD image signal is being outputted from the OSD image output section 351 (step S13). When the OSD image signal is being outputted (Yes in step S13), the process returns to step S10. When the OSD image signal is not being outputted (No in step S13), the control section 37 controls the OSD image output section 351 so as to start outputting the OSD image signal (step S14). Then, the control section 37 controls the video synthesizing section 353 so as to synthesize the OSD image signal and the decoded video signal and output the synthesized signal (step S15). After step S15, the process returns to step S10.

When the obtained PMT does not include the sub-audio information (No in step S11) or when an input of the sub-audio stream is not detected (No in step S12), the control section 37 determines whether the OSD image signal is being outputted from the OSD image output section 351 (step S16). When the OSD image signal is not being outputted (No in step S16), the process returns to step S10. When the OSD image signal is being outputted (Yes in step S16), the control section 37 controls the OSD image output section 351 so as to stop outputting the OSD image signal (step S17). Then, the control section 37 controls the video synthesizing section 353 so as to stop synthesizing the OSD image signal and the decoded video signal and outputting the synthesized signal (step S18). After step S18, the process returns to step S10.

Figure 8:
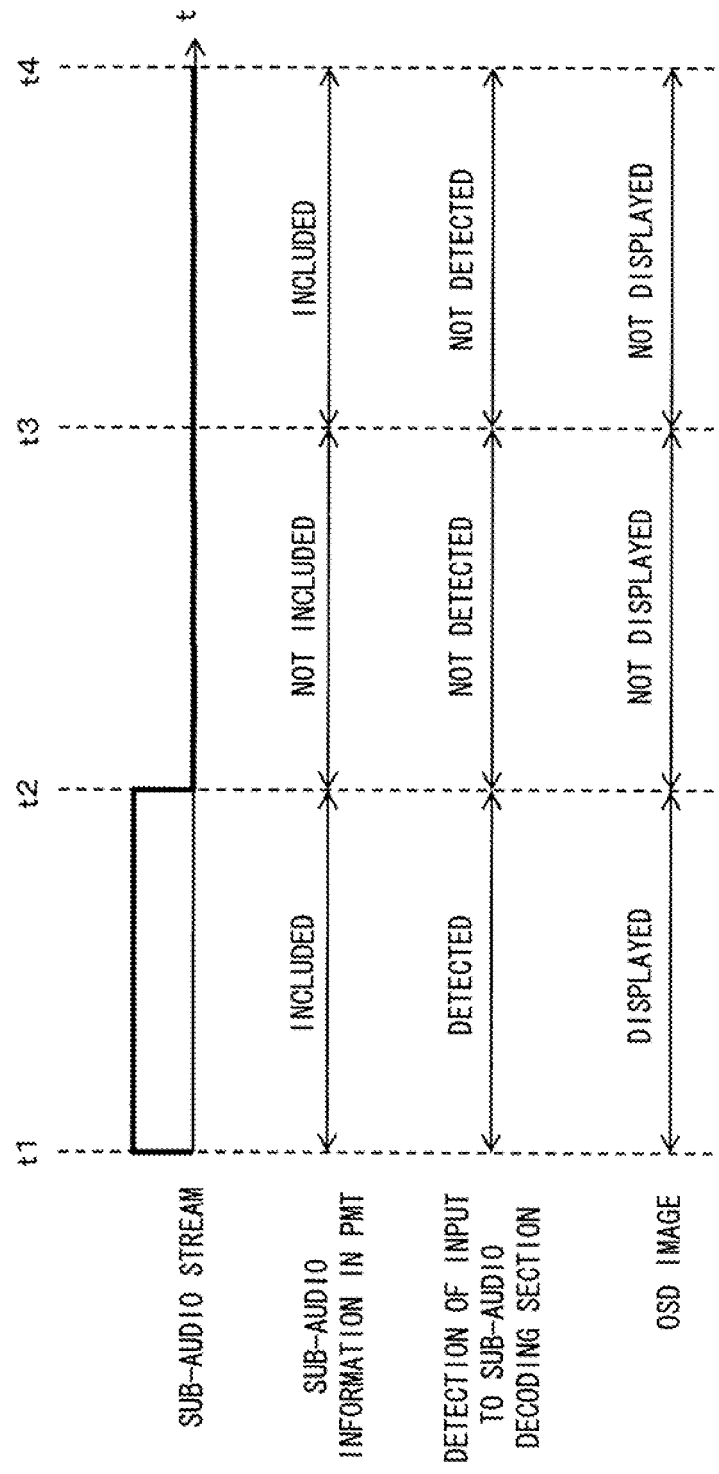
FIG. 8 is a diagram illustrating an example of a display state of the OSD image according to the first embodiment.

Next, with reference to FIG. 8, description will be given of a display state of an OSD image based on the display control of the control section 37 as described in FIG. 7. FIG. 8 is a diagram illustrating an example of a display state of the OSD image according to the first embodiment. In the case of FIG. 8, it is assumed that the OSD image is not outputted and therefore is in a nondisplay state at a time t1, and that a predetermined timing is reached at the time t1. It is also assumed that: the PMT includes the sub-audio information during a time period from t1 to t2 and a time period from t3 to t4; the sub-audio stream is inputted to the sub-audio decoding section 332 during the time period from t1 to t2; and an input of the sub-audio stream is detected during the time period from t1 to t2.

At the time t1, because the PMT includes the sub-audio information and an input of the sub-audio stream is detected, it is determined Yes in each of the processes of steps S10 to S12. At the time t1, the OSD image is not outputted and therefore is in the nondisplay state. Accordingly, it is determined No in the process of step S13 and the OSD image enters a display state through the processes of steps S14 and S15. Because the OSD image enters the display state through the processes of steps S14 and S15, after the process of step S15, the processes of steps S10 to S13 are repeated until the time t2. Consequently, after the process of step S15, the OSD image remains in the display state until the time t2.

At the time t2, because the PMT does not include the sub-audio information, it is determined Yes in the process of step S10 but determined No in the process of step S11. At the time t2, the OSD image is in the display state. Accordingly, it is determined Yes in the process of step S16 and, the OSD image enters the nondisplay state through the processes of steps S17 and S18. Because the OSD image enters the nondisplay state through the processes of steps S17 and S18, after the process of step S18, the processes of steps S10, S11 and S16 are repeated until the time t3. Consequently, after the process of step S18, the OSD image remains in the nondisplay state until the time t3.

At the time t3, the PMT includes the sub-audio information and therefore it is determined Yes in each of the processes of steps S10 and S11. However, because an input of the sub-audio stream is not detected, it is determined No in step S12.

At the time t3, the OSD image is in the nondisplay state. Accordingly, it is determined No in the process of step S16, and the processes of steps S10 to S12, and S16 are repeated. Consequently, from the time t3 to the time t4, the OSD image remains in the nondisplay state.

Conventionally, presence or absence of sub-audio has been determined by only using a PMT. For this reason, during the time period from t3 to t4, even though a sub-audio stream is absent, an OSD image enters the display state, which confuses a viewer. On the other hand, in the present embodiment, presence or absence of sub-audio is determined based on the detection result of the input detecting section 38. Accordingly, in the present embodiment, during the time period from t3 to t4, the OSD image is in the nondisplay state, which can prevent the viewer from being confused.

As described above, in the present embodiment, presence or absence of sub-audio is determined based on the detection result of the input detecting section 38. Consequently, in the present embodiment, presence or absence of sub-audio can be determined accurately and thus the viewer can be prevented from being confused.

In the above description, the input detecting section 38 directly monitors the input buffer included in the sub-audio decoding section 332 to detect an input of a sub-audio stream, but the present invention is not limited thereto. For example, the input detecting section 38 may be provided at a preceding stage of the sub-audio decoding section 332 and the input detecting section 38 detects the sub-audio stream inputted thereto and thereby detecting an input of the sub-audio stream to the sub-audio decoding section 332.

In the above description, the control section 37, when the sub-audio is absent, controls the OSD image output section 351 so as not to output the OSD image signal, but the present invention is not limited thereto. The control section 37, when the sub-audio is absent, may control the OSD image output section 351 so as to output an OSD image signal that does not include the sub-audio image. In such a case, the control section 37, only when a viewer gives an instruction using a remote control or the like to display the OSD image, controls the video synthesizing section 353 so as to synthesize the OSD image signal and the decoded video signal and output the synthesized signal to the video display section 36. Accordingly, the viewer can cause display of the OSD image only when the viewer has given an instruction to display the OSD image and can recognize presence or absence of sub-audio based on whether the sub-audio image is displayed on the displayed OSD image.

In the above description, the digital broadcast receiver 3 includes the audio reproducing section 34 and the video display section 36. However, the digital broadcast receiver 3 may not have to include these components. In such a case, the audio reproducing section 34 and the video display section 36 may be provided outside the digital broadcast receiver 3, and an output of the audio generating section 33 is inputted to the external audio reproducing section 34, and an output of the video generating section 35 is inputted to the video display section 36.

In the above description, the video generating section 35 includes the video synthesizing section 353 to display the OSD image including the sub-audio image on the broadcast video. However, the video generating section 35 may not have to include the video synthesizing section 353. In such a case, an output of the video decoding section 352 is inputted to the video display section 36, and an output of the OSD image output section 351 is inputted to a display section (not shown) such as an information display panel included in the digital broadcast receiver 3. When the digital broadcast receiver 3 is, for example, an STB, the information display panel is usually provided on the front surface of the digital broadcast receiver 3. The video display section 36 is usually provided outside the digital broadcast receiver 3. When the sub-audio is present, the OSD image output section 351 outputs, to the information display panel, the sub-audio image signal to display the sub-audio image indicating the presence of sub-audio and compatible with the information display panel. Accordingly, the broadcast video is displayed on the video display section 36, and presence or absence of sub-audio is displayed on the information display panel. The OSD image output section 351, when the sub-audio is absent, may output a main audio video signal indicating only the presence of main audio to the information display panel.

In the above description, the control section 37 determines presence or absence of sub-audio by using the PMT included in the program information data having been separated by the signal separating section 32 and the detection result of the input detecting section 38. However, the present invention is not limited thereto. The control section 37 may determine presence or absence of sub-audio by using at least the detection result of the input detecting section 38. Accordingly, the control section 37 may determine presence or absence of sub-audio by using only the detection result of the input detecting section 38, or may determine presence or absence of sub-audio by using the EIT included in the program information data and the detection result of the input detecting section 38, or may determine presence or absence of sub-audio by using the PMT and the EIT included in the program information data and the detection result of the input detecting section 38.

Second Embodiment

Figure 9:
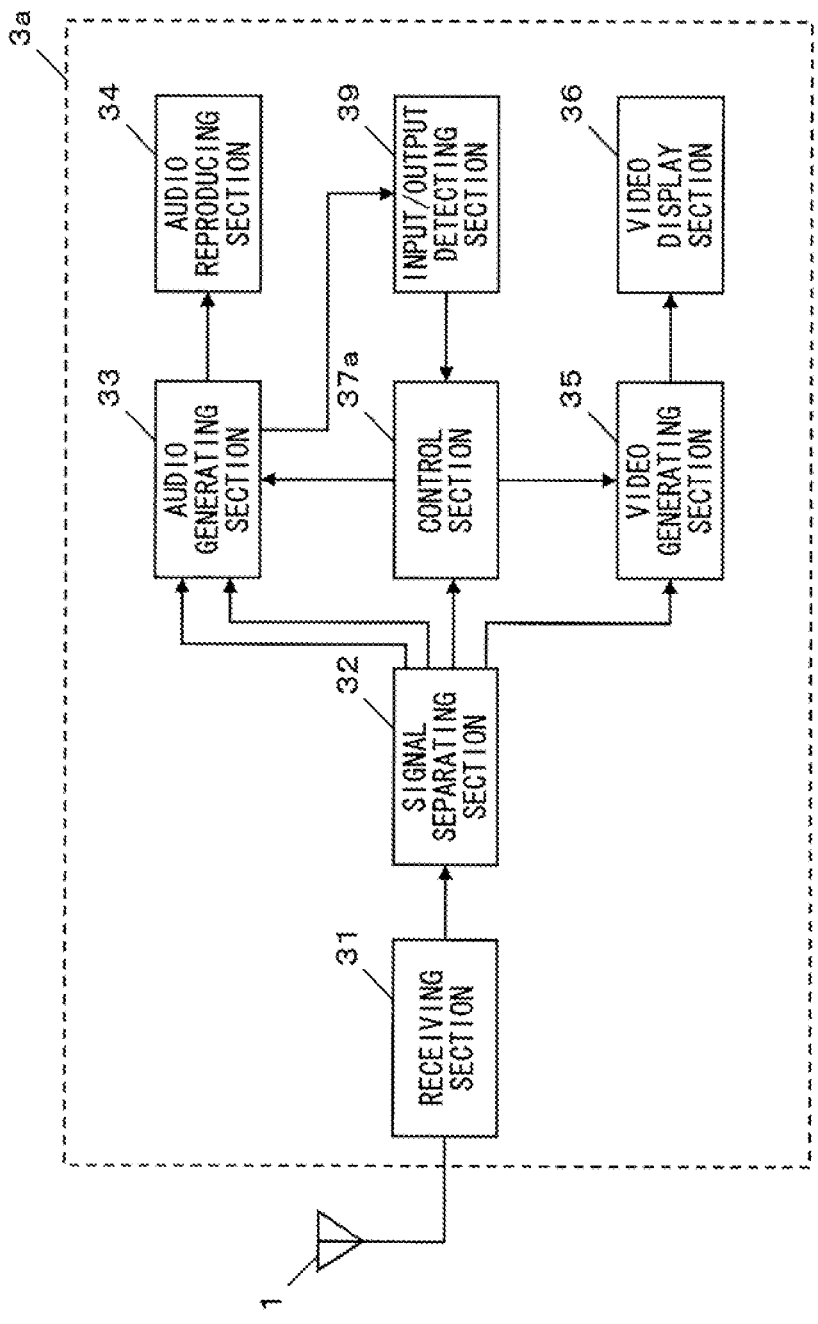
FIG. 9 is a diagram illustrating a configuration example of a digital broadcast receiver according to a second embodiment.

With reference to FIG. 9, description will be given of a configuration of a digital broadcast receiver according to a second embodiment of the present invention. FIG. 9 is a diagram illustrating a configuration example of the digital broadcast receiver according to the second embodiment. In FIG. 9, a digital broadcast receiver 3a is connected to an antenna 1 and includes a receiving section 31, a signal separating section 32, an audio generating section 33, an audio reproducing section 34, a video generating section 35, a video display section 36, a control section 37a, and an input/output detecting section 39.

The digital broadcast receiver 3a according to the present embodiment is different from the digital broadcast receiver 3 according to the first embodiment shown in FIG. 1, only in that the input detecting section 38 is replaced with the input/output detecting section 39, and the control section 37 is replaced with the control section 37a. Other components are similar to those shown in FIG. 1, and thus the same reference numerals as those of FIG. 1 are given to omit detailed descriptions thereof. Hereinafter, differences will be mainly described.

The control section 37a obtains, at a predetermined timing, a PMT included in program information having been separated by the signal separating section 32 and a detection result of the below-described input/output detecting section 39. Then, based on the obtained PMT and the detection result, the control section 37a determines presence or absence of sub-audio at a predetermined timing. Other components are similar to those of the control section 37, and thus descriptions thereof are omitted.

Figure 10:
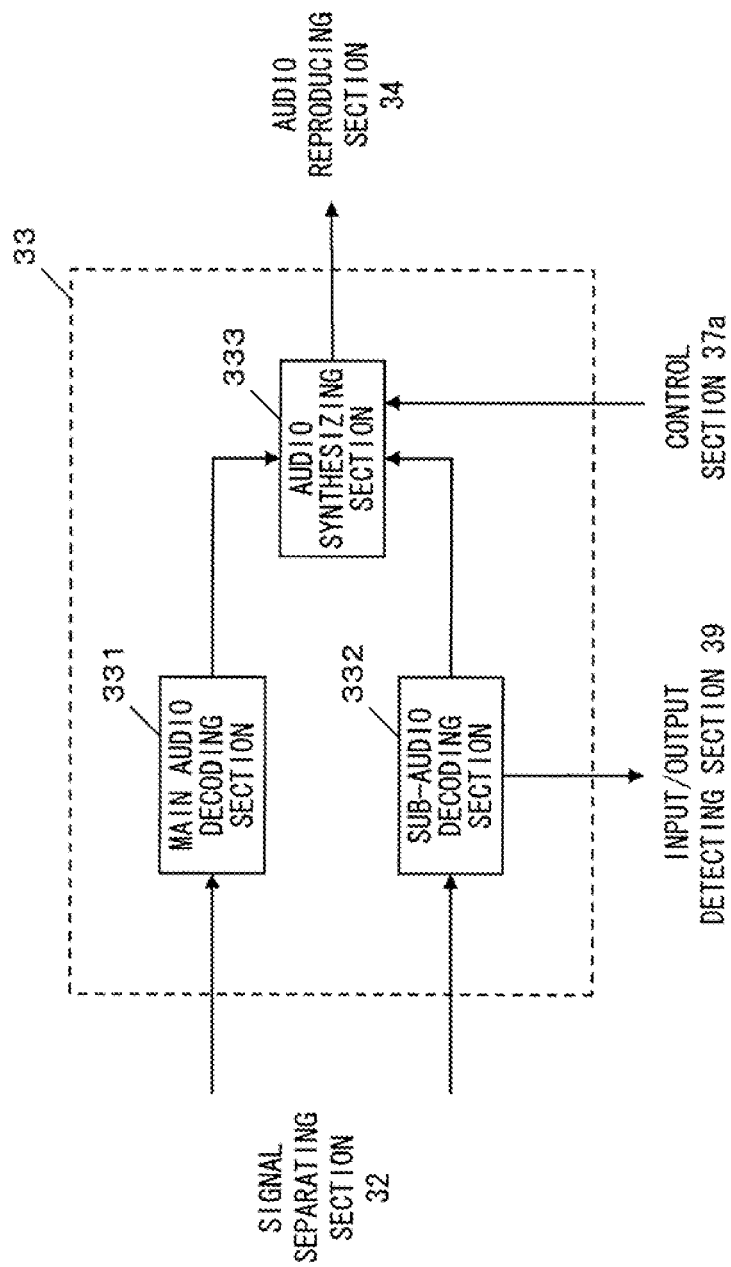
FIG. 10 is a diagram illustrating a specific configuration of an audio generating section 33 according to the second embodiment.

As shown in FIG. 10, the input/output detecting section 39 directly monitors an input buffer included in the sub-audio decoding section 332 at a predetermined timing to detect an input of a sub-audio stream to the sub-audio decoding section 332. FIG. 10 is a diagram illustrating a specific configuration of the audio generating section 33. The input/output detecting section 39 directly monitors an output buffer included in the sub-audio decoding section 332 at a predetermined timing so as to detect that the level of the decoded sub-audio signal that is a decoding result of the sub-audio decoding section 332, is not "0". Specifically, based on a predetermined threshold value, when the level of the decoded sub-audio signal is greater than or equal to the threshold value, the input/output detecting section 39 detects that the level of the decoded sub-audio signal is not "0." The input/output detecting section 39 outputs the detection result to the control section 37a. The control section 37a determines that the sub-audio is present, only when: the PMT includes sub-audio information; the input/output detecting section 39 detects an input of the sub-audio stream; and the level of the decoded sub-audio signal is not "0."

Figure 11:
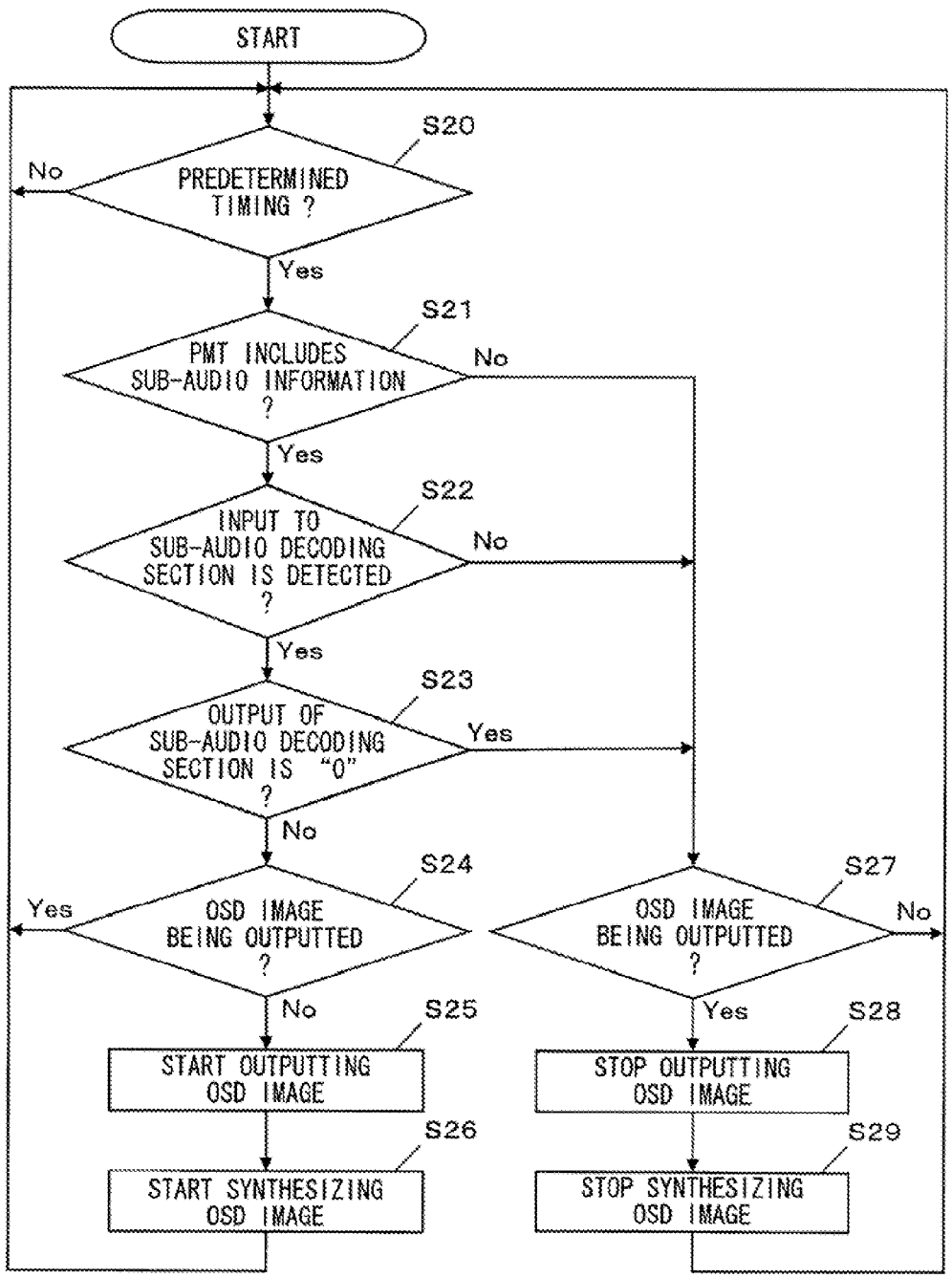

Next, with reference to FIG. 11, description will be given of the procedure of the above-described display control process of the control section 37a. FIG. 11 is a flowchart illustrating the procedure of the display control process of the control section 37a. The procedure of the display control shown in FIG. 11 is different from the procedure of the display control according to the first embodiment shown in FIG. 7, in that a process of step S23 is added. Steps other than S23, steps S20 to S22 and steps S24 to S29 are similar to steps S10 to S12 and steps S13 to S18 shown in FIG. 7, respectively. Hereinafter, differences will be mainly described.

In step S22, when an input of the sub-audio stream is detected (Yes in step S22), the control section 37a obtains the detection result of the input/output detecting section 39. Then, the control section 37a determines whether the level of the decoded sub-audio signal that is a decoding result (output) of the sub-audio decoding section 332, is "0" (step S23). When the level of the decoded sub-audio signal is "0" (Yes in step S23), the process proceeds to step S27. When the level of the decoded sub-audio signal is not "0" (No in step S23), the process proceeds to step S24.

Figure 12:
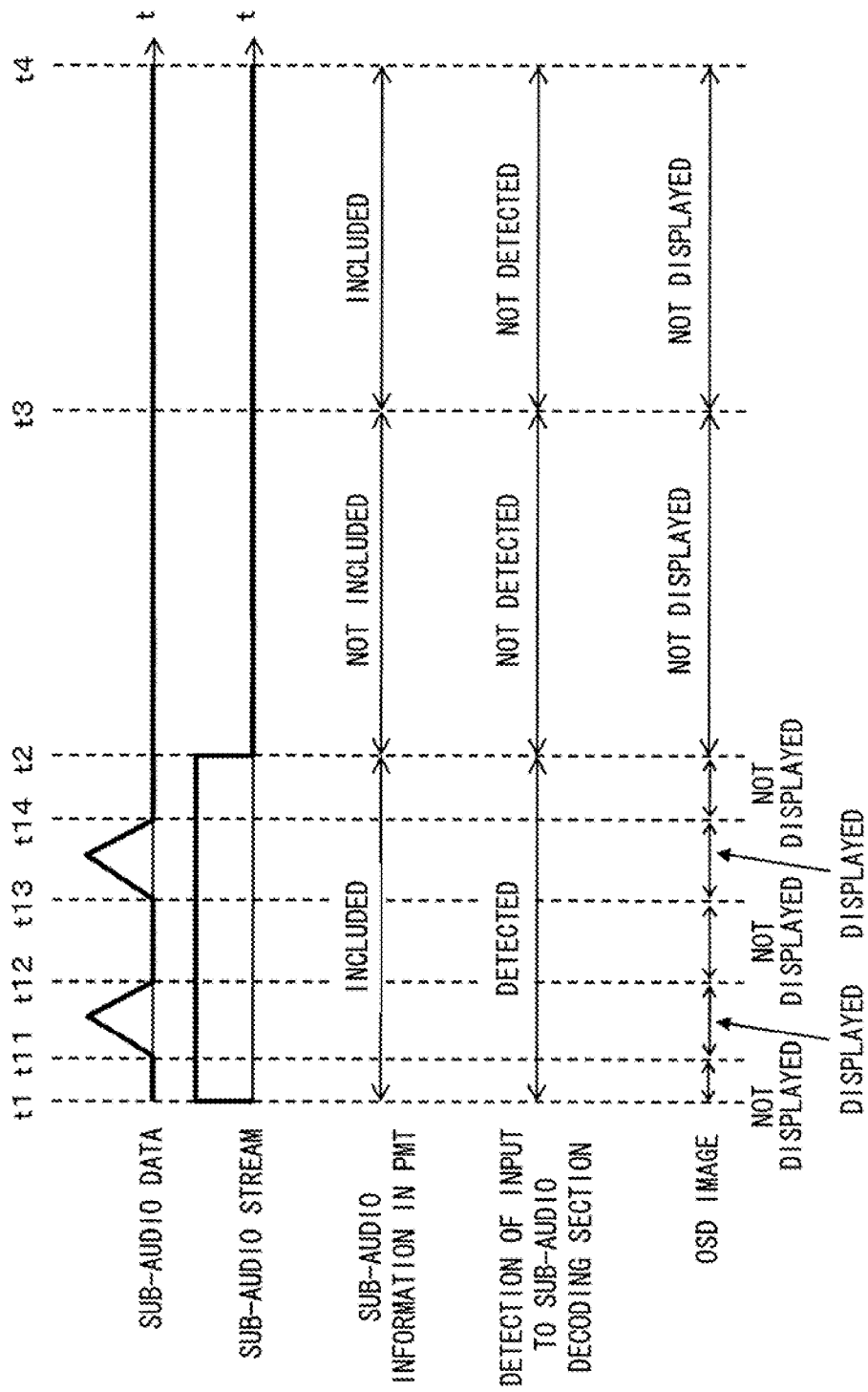
FIG. 12 is a diagram illustrating an example of a display state of an OSD image according to the second embodiment.

Next, with reference to FIG. 12, description will be given of a display state of an OSD image based on the display control of the control section 37a as described in FIG. 11. FIG. 12 is a diagram illustrating an example of a display state of the OSD image according to the second embodiment. In the case of FIG. 12, it is assumed that the OSD image is not outputted and therefore is in a nondisplay state at a time t1, and that a predetermined timing is reached at the time t1. It is also assumed that: the PMT includes the sub-audio information during a time period from t1 to t2 and a time period from t3 to t4; the sub-audio stream is inputted to the sub-audio decoding section 332 during the time period from t1 to t2; and an input of the sub-audio stream is detected during the time period from t1 to t2. It is also assumed that during a time period from t11 to t12 and a time period from t13 to t14, the level of the decoded sub-audio signal is not "0."

At the time t1, because the PMT includes the sub-audio information and an input of the sub-audio stream is detected, it is determined Yes in each of the processes of steps S20 to S22. However, because the level of the decoded sub-audio signal is "0," it is determined Yes in the process of step S23, and the process proceeds to step S27. At the time t1, the OSD image is not outputted and therefore is in the nondisplay state. Accordingly, it is determined No in the process of step S27, and the process returns to step S20. From the time t1 to the time t11, processes of steps S20 to S23, and S27 are repeated. Consequently, from the time t1 to the time t11, the OSD image remains in the nondisplay state.

At the time t11, because the level of the decoded sub-audio signal is not "0," it is determined No in the process of step S23. At the time t11, the OSD image is in the nondisplay state. Accordingly, it is determined No in the process of step S24, and the OSD image enters the display state through the processes of steps S25 and S26. Because the OSD image enters the display state through the processes of steps S25 and S26, after the process of step S26, the processes of steps S20 to S24 are repeated until the time t12. Consequently, after the process of step S26, the OSD image remains in the display state until the time t12.

At the time t12, because the level of the decoded sub-audio signal is "0," it is determined Yes in the process of step S23. At the time t12, the OSD image is in the display state. Accordingly, it is determined Yes in the process of step S27, and the OSD image enters the nondisplay state through the processes of steps S28 and S29. Because the OSD image enters the nondisplay state through the processes of steps S28 and S29, after the process of step S29, the processes of steps S20 to S23, and S27 are repeated until the time t13. Consequently, after the process of step S29, the OSD image remains in the nondisplay state until the time t13.

In the similar manner, the OSD image is in the display state during the time period from t13 to time t14 and the OSD image is in the nondisplay state during a time period from t14 to time t2. Through the processes described above, the OSD image is displayed only while the output level of the decoded sub-audio signal is not "0" as in during the time period from t11 to t12 and the time period from t13 to t14. The processes after the time t2 are identical to those of the first embodiment, and thus descriptions thereof are omitted.

As described above, according to the present embodiment, presence or absence of sub-audio is determined by additionally using the level of the decoded sub-audio signal. Accordingly, in the present embodiment, the OSD image can be displayed only while the output level of the decoded sub-audio signal is not "0." As a result, it is possible to correctly inform a viewer of presence or absence of sub-audio.

In the above description, the input/output detecting section 39 directly monitors the input buffer included in the sub-audio decoding section 332 to detect an input of the sub-audio stream. However, the present invention is not limited thereto. For example, an input detecting part (not shown) of the input/output detecting section 39 may be provided at a preceding stage of the sub-audio decoding section 332 so that the input detecting part detects the sub-audio stream inputted thereto and thereby detecting an input of the sub-audio stream to the sub-audio decoding section 332. The input/output detecting section 39 directly monitors the output buffer included in the sub-audio decoding section 332, to detect that a decoding result of the sub-audio decoding section 332 is not "0". However, the present invention is not limited thereto. For example, an output detecting part (not shown) of the input/output detecting section 39 may be provided at a subsequent stage of the sub-audio decoding section 332 so that the output detecting part may refer to the level of the decoded sub-audio signal inputted thereto so as to detect that the decoding result of the sub-audio decoding section 332 is not "0." Alternatively, instead of detecting that the decoding result of the sub-audio decoding section 332 is not "0," the input/output detecting section 39 may detect that the level of the decoded sub-audio signal is not extremely low.

Third Embodiment

Figure 13:
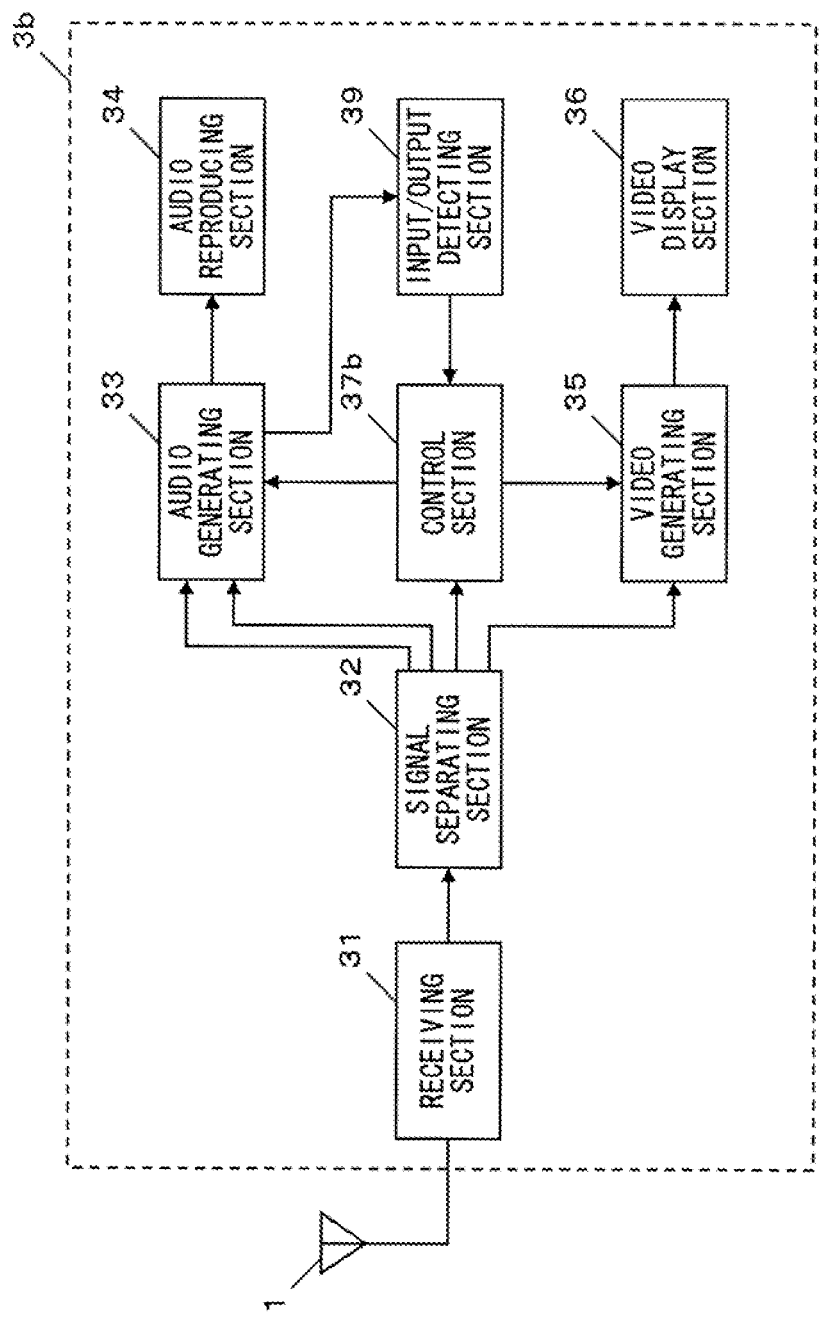
FIG. 13 is a diagram illustrating a configuration example of a digital broadcast receiver according to a third embodiment.

With reference to FIG. 13, description will be given of a digital broadcast receiver according to a third embodiment of the present invention. FIG. 13 is a diagram illustrating a configuration example of the digital broadcast receiver according to the third embodiment. In FIG. 13, a digital broadcast receiver 3b is connected to an antenna 1 and includes a receiving section 31, a signal separating section 32, an audio generating section 33, an audio reproducing section 34, a video generating section 35, a video display section 36, a control section 37b, and an input/output detecting section 39.

The digital broadcast receiver 3b according to the present embodiment is different from the digital broadcast receiver 3a according to the second embodiment shown in FIG. 9, only in that the control section 37a is replaced with the control section 37b. Other components are similar to those shown in FIG. 9, and thus the same reference numerals as those of FIG. 9 are given to omit detailed descriptions thereof. Hereinafter, differences will be mainly described.

In a situation where an OSD image is being displayed, when the level of the decoded sub-audio signal becomes "0," the control section 37b continues to display the OSD image from the time the level of the decoded sub-audio signal becomes "0" until a set time period elapses. Other components are similar to those of the control section 37a, and thus descriptions thereof are omitted.

Figure 14:
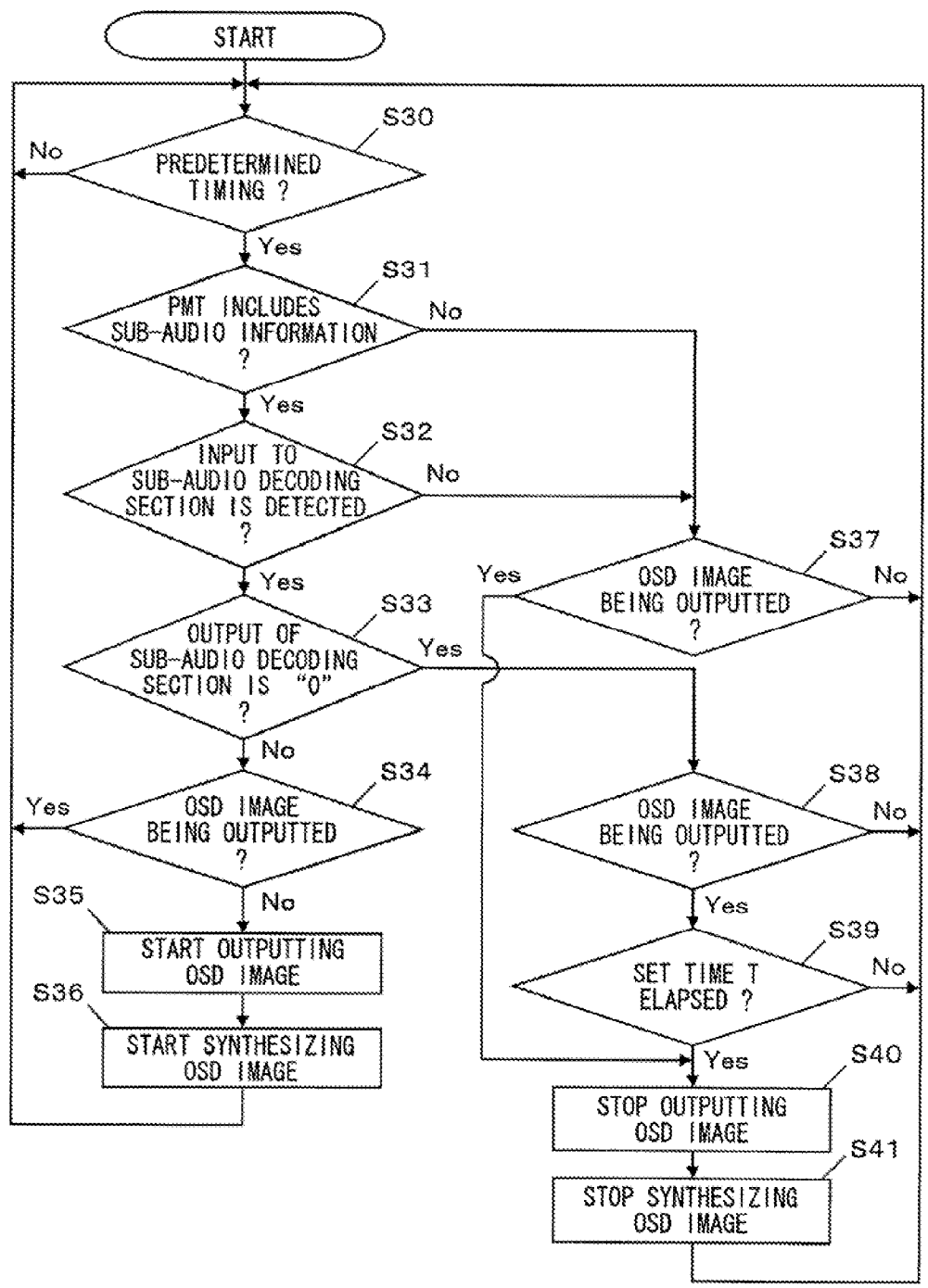
FIG. 14 is a flowchart illustrating a procedure of a display control process of a control section 37b.

Next, with reference to FIG. 14, description will be given of the procedure of the above-described display control process of the control section 37b. FIG. 14 is a flowchart illustrating the procedure of the display control process of the control section 37b. The procedure of the display control shown in FIG. 14 is different from the procedure of the display control according to the second embodiment shown in FIG. 11, in that processes of steps S38 and S39 are added. Steps other than steps S38 and S39, steps S30 to S36, step S37, and steps S40 and S41 are similar to steps S20 to S26, step S27, and steps S28 and S29 shown in shown in FIG. 11, respectively. Hereinafter, differences will be mainly described.

In step S33, when the level of the decoded sub-audio signal is "0" (Yes in step S33), the control section 37b determines whether an OSD image signal is being outputted from the OSD image output section 351 (step S38). When the OSD image signal is not being outputted (No in step S38), the process returns to step S30. When the OSD image signal is being outputted (Yes in step S38), the control section 37b determines whether a set time period T has elapsed from the time the level of the decoded sub-audio signal became "0" (step S39). When the set time T has not elapsed (No in step S39), the process returns to step S30. When the set time T has elapsed (Yes in step S39), the process proceeds to step S40.

Figure 15:
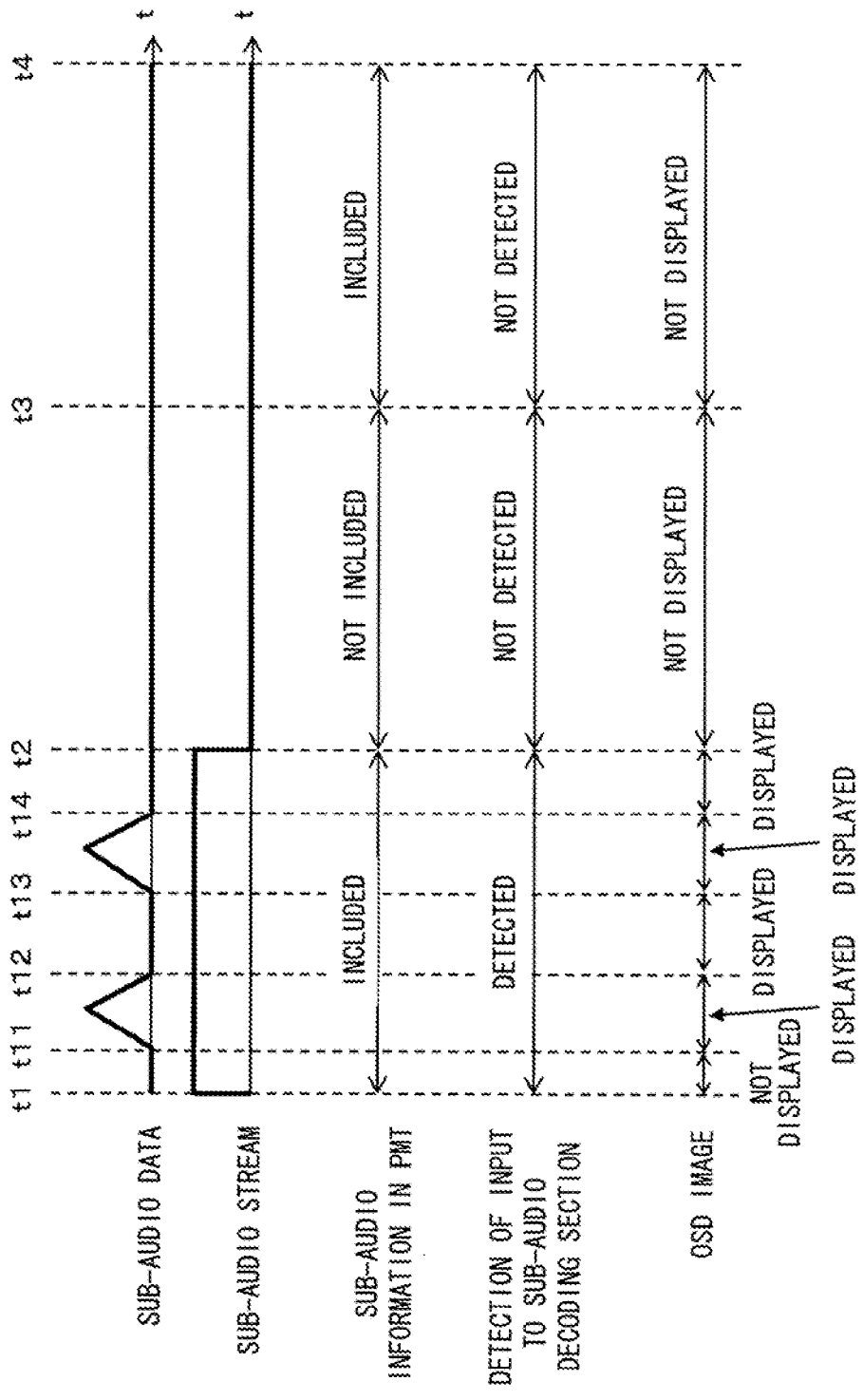
FIG. 15 is a diagram illustrating an example of a display state of an OSD image according to the third embodiment.

Next, with reference to FIG. 15, description will be given of a display state of an OSD image based on the display control of the control section 37b as described in FIG. 14. FIG. 15 is a diagram illustrating an example of a display state of the OSD image according to the third embodiment. In the case of FIG. 15, it is assumed that the OSD image is not outputted and therefore is in a nondisplay state at a time t1, and that a predetermined timing is reached at the time t1. It is also assumed that: a PMT includes sub-audio information during a time period from t1 to t2, and a time period from t3 to t4; the sub-audio stream is inputted to the sub-audio decoding section 332 during the time period from t1 to t2; and an input of the sub-audio stream is detected during the time period from t1 to t2. It is also assumed that during a time period from t11 to t12 and a time period from t13 to t14, the level of the decoded sub-audio signal is not "0." It is further assumed that each of a time period from t12 to t13 and a time period from t14 to t2 is shorter than the set time period T.

At the time t1, because the PMT includes the sub-audio information and an input of the sub-audio stream is detected, it is determined Yes in each of processes of steps S30 to S32. However, because the level of the decoded sub-audio signal is "0," it is determined Yes in the process of step S33, and the process proceeds to step S38. At the time t1, the OSD image is not outputted and therefore is in a nondisplay state. Accordingly, it is determined No in step S38, and the process returns to step S30. From the time t1 to a time t11, processes of steps S30 to S33, and S38 are repeated. Consequently, from the time t1 to the time t11, the OSD image remains in the nondisplay state.

At the time t11, because the level of the decoded sub-audio signal is not "0," it is determined No in the process of step S33. At the time t11, the OSD image is in the nondisplay state. Accordingly, it is determined No in the process of step S34, and the OSD image enters the display state through the processes of steps S35 and S36. Because the OSD image enters the display state through the processes of steps S35 and S36, after the process of step S36, the processes of steps S30 to S34 are repeated until the time t12. Consequently, after the process of step S36 the OSD image remains in the display state until the time t12.

At the time t12, because the level of the decoded sub-audio signal is "0," it is determined Yes in the process of step S33. At the time t12, the OSD image is in the display state. Accordingly, it is determined Yes in the process of step S38, and the process proceeds to step S39. In step S39, it is determined Yes only after the set time period T has elapsed from the time the level of the decoded sub-audio signal became "0." The time period from t12 to t13 is shorter than the set time period T. Accordingly, during the time period from t12 to t13, it is determined No in step S39, and processes of steps S30 to S33, S38, and S39 are repeated. Consequently, during the time period from t12 to t13, the OSD image remains in the display state.

At the time t13, because the level of the decoded sub-audio signal is not "0," it is determined No in the process of step S33. At the time t13, the OSD image is in the display state. Accordingly, it is determined Yes in the process of step S34, and processes of steps S30 to S34 are repeated. Consequently, during the time period from t13 to t14, the OSD image remains in the display state.

At the time t14, because the level of the decoded sub-audio signal is "0," it is determined Yes in the process of step S33. At the time t14, the OSD image is in the display state. Accordingly, it is determined Yes in the process of step S38, and the process proceeds to step S39. In step S39, it is determined Yes only after the set time period T has elapsed from the time the level of the decoded sub-audio signal became "0." The time period from t14 to t2 is shorter than the set time period T. Accordingly, during the time period from t14 to t2, it is determined No in step S39, and processes of steps S30 to S33, S38, and S39 are repeated. Consequently, during the time period from t14 to t2, the OSD image remains in the display state.

At the time t2, because the PMT does not include the sub-audio information, it is determined No in the process of step S31. At the time t2, the OSD image is in the display state. Accordingly, it is determined Yes in step S37 and, the OSD image enters the nondisplay state through the processes of steps S40 and S41. The subsequent processes are similar to those of the first embodiment, and thus descriptions thereof are omitted.

Through the processes described above, the OSD image is displayed during the time period from t11 to t2. Accordingly, even when the decoding result of the sub-audio decoding section 332 fluctuates significantly, the viewer can easily recognize presence or absence of sub-audio.

As described above, in the present embodiment, in a situation where the OSD image is being displayed, when the level of the decoded sub-audio signal becomes "0," the OSD image continues to be displayed from the time the level of the decoded sub-audio signal becomes "0" until a set time period elapses. Thus, even when the decoding result of the sub-audio decoding section 332 fluctuates significantly, the viewer can easily recognize presence or absence of sub-audio.

INDUSTRIAL APPLICABILITY

The digital broadcast receiver according to the present invention can correctly inform a viewer whether a program being viewed contains sub-audio, and it is applicable, for example, to televisions that are compatible with digital broadcast.

The invention claimed is:

1. A digital broadcast receiver which receives a digital broadcast signal in which a video signal and either of an audio signal including a main audio signal or an audio signal including a main audio signal and a sub-audio signal are multiplexed, and which informs a viewer by a visual display whether the received digital broadcast signal includes the sub-audio signal, and the digital broadcast receiver comprising:

a receiving section that receives the digital broadcast signal and decodes the received digital broadcast signal to output a decoded digital broadcast signal;

a signal separating section that separates the main audio signal and the video signal from the decoded digital broadcast signal inputted thereto, and when the audio signal consists of the main audio signal and the sub-audio signal, further separates the sub-audio signal from the inputted decoded digital broadcast signal;

an audio generating section that decodes the main audio signal inputted thereto, which has been separated by the signal separating section to generate a decoded main audio signal that can be reproduced, and when the signal separating section has further separated the sub-audio signal, decodes the sub-audio signal inputted thereto, which has been separated by the signal separating section to further generate a decoded sub-audio signal that can be reproduced;

a video generating section that decodes the video signal inputted thereto, which has been separated by the signal separating section to generate a decoded video signal that can be displayed;

a detecting section that, by monitoring an input side of the audio generating section and directly detecting a presence of the sub-audio signal, detects an input to the audio generating section of the sub-audio signal having been separated by the signal separating section; and a control section that, when the detecting section has detected an input of the sub-audio signal to the audio generating section, controls the video generating section so as to further generate a sub-audio image signal to display a sub-audio image indicating the presence of the sub-audio signal, wherein the detecting section further detects whether or not the level of the decoded sub-audio signal is greater than or equal to a predetermined value, and the control section, when the detecting section has detected an input of the sub-audio signal to the audio generating section by directly detecting a presence of the sub-audio signal and also has detected that the level of the decoded sub-audio signal is greater than or equal to the predetermined value, controls the video generating section so as to further generate the sub-audio image signal.

2. The digital broadcast receiver according to claim 1, wherein the audio generating section includes:

a main audio decoding section that decodes the main audio signal inputted thereto to generate the decoded main audio signal; and a sub-audio decoding section that decodes the sub-audio signal inputted thereto to generate the decoded sub-audio signal, and the detecting section, by monitoring an input side of the sub-audio decoding section and directly detecting a presence of the sub-audio signal, detects an input of the sub-audio signal to the sub-audio decoding section.

3. The digital broadcast receiver according to claim 2, wherein the detecting section, by monitoring an input buffer included in the sub-audio decoding section and directly detecting a presence of the sub-audio signal, detects an input of the sub-audio signal to the sub-audio decoding section.

4. The digital broadcast receiver according to claim 2, wherein the detecting section is provided at a preceding stage of the sub-audio decoding section, and by detecting an input of the sub-audio signal thereto and directly detecting a presence of the sub-audio signal, detects an input of the sub-audio signal to the sub-audio decoding section.

5. The digital broadcast receiver according to claim 1, wherein the audio generating section includes:

a main audio decoding section that decodes the main audio signal inputted thereto to generate the decoded main audio signal; and a sub-audio decoding section that decodes the sub-audio signal inputted thereto to generate the decoded sub-audio signal, and the detecting section, by directly detecting a presence of the sub-audio signal, detects an input of the sub-audio signal to the sub-audio decoding section to detect whether or not the level of the decoded sub-audio signal is greater than or equal to the predetermined value.

6. The digital broadcast receiver according to claim 5, wherein the detecting section monitors an input buffer included in the sub-audio decoding section and directly detects a presence of the sub-audio signal, to detect an input of the sub-audio signal to the sub-audio decoding section, and monitors an output buffer included in the sub-audio decoding section to detect whether or not the level of the decoded sub-audio signal is greater than or equal to the predetermined value.

7. The digital broadcast receiver according to claim 5, wherein the detecting section includes:

an input detecting section which is provided at a preceding stage of the sub-audio decoding section and which, by detecting an input of the sub-audio signal thereto and directly detecting a presence of the sub-audio signal, detects an input of the sub-audio signal to the sub-audio decoding section; and an output detecting section which is provided at a subsequent stage of the sub-audio decoding section, and which refers to the level of the decoded sub-audio signal inputted thereto to detect whether or not the level of the decoded sub-audio signal is greater than or equal to the predetermined value.

8. The digital broadcast receiver according to claim 1, wherein
the control section controls, in a situation where the sub-audio image signal is being generated, when the detecting section has detected an input of the sub-audio signal to the audio generating section by directly detecting a presence of the sub-audio signal and also has detected that the level of the decoded sub-audio signal is lower than the predetermined value, the video generating section so as to continue the generation of the sub-audio image signal for a set time period from the time point of the detection.

9. The digital broadcast receiver according to claim 1, further comprising
a display section that displays an image based on the decoded video signal generated by the video generating section, and further displays, when the video generating section has further generated a sub-audio image signal, a sub-audio image based on the sub-audio image signal on an image based on the decoded video signal.

10. The digital broadcast receiver according to claim 1, which is connected to an external display device, wherein
the video generating section outputs the generated decoded video signal to the display device, and when the video generating section has further generated the sub-audio image signal, synthesizes the generated decoded video signal and the sub-audio image signal to output the synthesized signal to the display device so as to display the sub-audio image based on the sub-audio image signal on the image based on the decoded video signal.

11. The digital broadcast receiver according to claim 1, which is connected to an external display device, further comprising
a display section that displays the sub-audio image based on the sub-audio image signal further generated by the video generating section, wherein the video generating section outputs the generated decoded video signal to the display device.

12. The digital broadcast receiver according to claim 1, wherein
the control section, when sub-audio information is included in an event information table (EIT) or a program map table (PMT) included in program information data and the detection section has directly detected a presence of the sub-audio signal, controls the video generating section so as to generate the sub-audio image signal, and when sub-audio information is included in an event information table (EIT) or a program map table (PMT) and the detection section has not directly detected a presence of the sub-audio signal, controls the video generating section so as not to generate the sub-audio image signal.

13. The digital broadcast receiver according to claim 1, wherein
the control section, when the detection section has directly detected a presence of the sub-audio signal and the level of the decoded sub-audio signal is smaller than the predetermined value, controls the video generating section so as not to generate the sub-audio image signal.

14. A digital broadcast reception method of receiving a digital broadcast signal in which a video signal and either of an audio signal including a main audio signal or an audio signal including a main audio signal and a sub-audio signal are multiplexed, and informing a viewer by a visual display whether the received digital broadcast signal includes the sub-audio signal, and the digital broadcast reception method comprising:
a receiving step of receiving the digital broadcast signal and decoding the received digital broadcast signal to output a decoded digital broadcast signal;
a signal separating step of separating the main audio signal and the video signal from the decoded digital broadcast signal, and when the audio signal consists of the main audio signal and the sub-audio signal, further separating the sub-audio signal from the decoded digital broadcast signal;
an audio generating step of decoding the main audio signal having been separated in the signal separating step to generate a decoded main audio signal that can be reproduced, and when the sub-audio signal has been further separated in the signal separating step, decoding the sub-audio signal having been separated in the signal separating step to further generate a decoded sub-audio signal that can be reproduced;
a video generating step of decoding the video signal having been separated in the signal separating step to generate a decoded video signal that can be displayed;
a detecting step of, by monitoring an input side of an audio generating section that decodes the sub-audio signal and directly detecting a presence of the sub-audio signal, detecting an input to the audio generating section of the sub-audio signal having been separated in the signal separating step; and
a sub-audio image generating step of generating a sub-audio image signal to display a sub-audio image indicating the presence of the sub-audio signal when an input to the audio generating section of the sub-audio signal is detected in the detecting step, wherein
the detecting step further includes detecting whether or not the level of the decoded sub-audio signal is greater than or equal to a predetermined value, and
the sub-audio image generating step, when the detecting step has detected an input of the sub-audio signal to the audio generating section by directly detecting a presence of the sub-audio signal and also has detected that the level of the decoded sub-audio signal is greater than or equal to the predetermined value, generates the sub-audio image signal.

* * * * *